United States Patent
Youn et al.

(10) Patent No.: US 9,696,852 B2
(45) Date of Patent: Jul. 4, 2017

(54) ELECTRONIC DEVICE FOR SENSING 2D AND 3D TOUCH AND METHOD FOR CONTROLLING THE SAME

(71) Applicant: LG ELECTRONICS INC., Seoul (KR)

(72) Inventors: Jinho Youn, Seoul (KR); Hyokune Hwang, Seoul (KR); Jaecheon Sa, Seoul (KR); Munchae Joung, Seoul (KR); Sunuk Kim, Seoul (KR); Youngjun Cho, Seoul (KR); Jaehyeuck Choi, Seoul (KR); Seungjae Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 88 days.

(21) Appl. No.: 14/670,195

(22) Filed: Mar. 26, 2015

(65) Prior Publication Data
US 2015/0378463 A1 Dec. 31, 2015

(30) Foreign Application Priority Data

Jun. 25, 2014 (KR) .................. 10-2014-0077872
Jun. 27, 2014 (KR) .................. 10-2014-0079458
Jun. 27, 2014 (KR) .................. 10-2014-0079459

(51) Int. Cl.
| | |
|---|---|
| G06F 3/042 | (2006.01) |
| G06F 3/01 | (2006.01) |
| G06F 3/03 | (2006.01) |
| G09G 5/18 | (2006.01) |
| G06F 3/0488 | (2013.01) |

(52) U.S. Cl.
CPC .............. *G06F 3/042* (2013.01); *G06F 3/017* (2013.01); *G06F 3/0304* (2013.01);
(Continued)

(58) Field of Classification Search
CPC ........ G06F 3/042; G06F 3/017; G06F 3/0304; G06F 3/0488; G06F 3/0325;
(Continued)

(56) References Cited

U.S. PATENT DOCUMENTS

| | | |
|---|---|---|
| 2009/0146946 A1 | 6/2009 | Takama et al. |
| 2009/0189878 A1 | 7/2009 | Goertz et al. |

(Continued)

FOREIGN PATENT DOCUMENTS

| | | |
|---|---|---|
| EP | 2336859 | 6/2011 |
| KR | 10-2010-0119936 | 11/2010 |

(Continued)

OTHER PUBLICATIONS

European Patent Office Application Serial No. 15170108.3 Search Report dated Dec. 1, 2015, 14 pages.

*Primary Examiner* — Towfiq Elahi
(74) *Attorney, Agent, or Firm* — Lee, Hong, Degerman, Kang & Waimey

(57) ABSTRACT

An electronic device having a function for sensing 2D and 3D touch which includes a display unit; a bezel frame unit; a plurality of light emitting units; a plurality of light receiving units; a light isolation unit configured to isolate a first light for sensing 2D touch and a second light for sensing 3D touch from the lights incident thereon from the light emitting units; a driving control unit configured to sequentially operate the plurality of the light emitting units; and a motion recognition unit configured to calculate a horizontal coordinate based on the quantity of the first light, to calculate a spatial coordinate based on the quantity of the second light, to extract a motion of the pointer based on the detected quantity of the light and to implement an operation corresponding to the extracted motion.

18 Claims, 21 Drawing Sheets

(52) U.S. Cl.
CPC .......... *G06F 3/0421* (2013.01); *G06F 3/0428* (2013.01); *G06F 3/0488* (2013.01); *G09G 5/18* (2013.01); *G06F 2203/04101* (2013.01); *G09G 2300/04* (2013.01)

(58) Field of Classification Search
CPC ................. G06F 3/0421; G06F 3/0428; G06F 2203/04101; G09G 5/18
See application file for complete search history.

(56) References Cited

U.S. PATENT DOCUMENTS

| | | |
|---|---|---|
| 2010/0177046 A1 | 7/2010 | Shin et al. |
| 2010/0295821 A1 | 11/2010 | Chang et al. |
| 2011/0157097 A1* | 6/2011 | Hamada ............... G02F 1/13338 345/175 |
| 2012/0146950 A1* | 6/2012 | Park ....................... G06F 3/0428 345/175 |
| 2012/0312956 A1* | 12/2012 | Chang .................... G06F 3/017 250/201.1 |

FOREIGN PATENT DOCUMENTS

| | | |
|---|---|---|
| KR | 10-1009912 | 1/2011 |
| KR | 10-2011-0032640 | 3/2011 |
| KR | 10-2012-0088344 | 8/2012 |
| KR | 10-2012-0120697 | 11/2012 |
| KR | 10-2013-0062100 | 6/2013 |
| KR | 10-2013-0111910 | 10/2013 |
| KR | 10-2013-0133307 | 12/2013 |

* cited by examiner

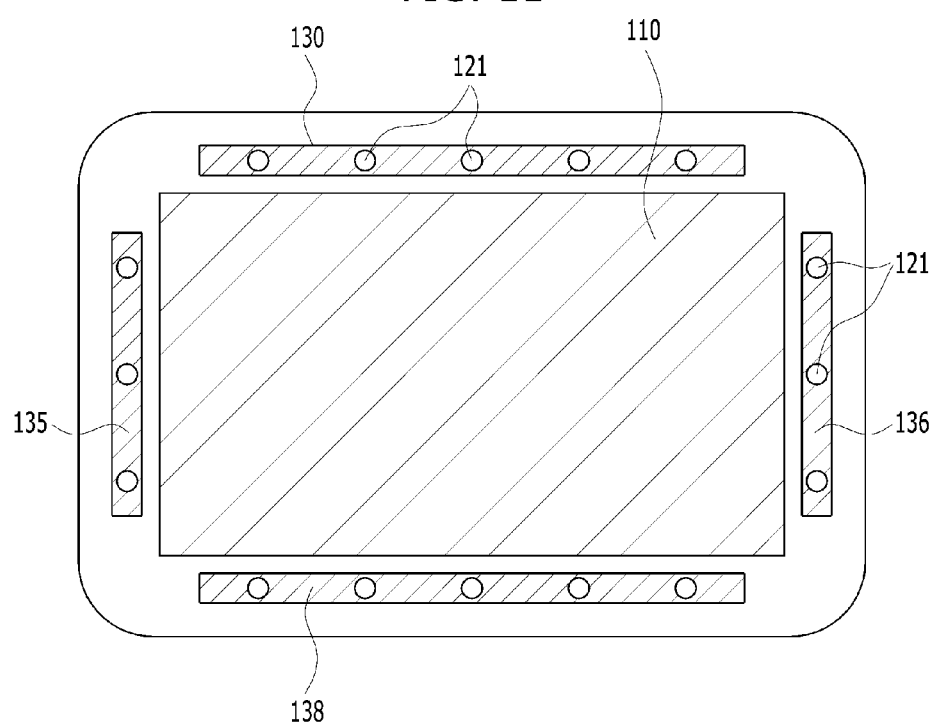

FIG. 25A

|  | PD1 | PD2 | PD3 | PD4 | PD5 | PD6 | PD7 | PD8 | PD9 | PD10 | PD11 | PD12 | PD13 | PD14 |
|---|---|---|---|---|---|---|---|---|---|---|---|---|---|---|
| LED 1 | 42 | 32 | 15 | 0 | 0 | 0 | 0 | 0 | 0 | 0 | 0 | 0 | 0 | 0 |
| LED 2 | 0 | 26 | 20 | 8 | 0 | 0 | 0 | 0 | 0 | 0 | 0 | 0 | 0 | 0 |
| LED 3 | 0 | 0 | 0 | 16 | 33 | 41 | 22 | 0 | 0 | 0 | 0 | 0 | 0 | 0 |
| LED 4 | 0 | 0 | 0 | 0 | 0 | 0 | 11 | 7 | 0 | 0 | 0 | 0 | 0 | 0 |
| LED 5 | 0 | 0 | 0 | 0 | 0 | 0 | 0 | 12 | 13 | 6 | 10 | 0 | 0 | 0 |
| LED 6 | 0 | 0 | 0 | 0 | 0 | 0 | 0 | 0 | 0 | 4 | 25 | 44 | 16 | 0 |
| LED 7 | 0 | 0 | 0 | 0 | 0 | 0 | 0 | 0 | 0 | 0 | 0 | 16 | 20 | 30 |

FIG. 25B

|  | PD1 | PD2 | PD3 | PD4 | PD5 | PD6 | PD7 | PD8 | PD9 | PD10 | PD11 | PD12 | PD13 | PD14 |
|---|---|---|---|---|---|---|---|---|---|---|---|---|---|---|
| LED 1 | 16 | 0 | 7 | 0 | 0 | 0 | 0 | 0 | 0 | 0 | 0 | 0 | 0 | 0 |
| LED 2 | 0 | 15 | 17 | 8 | 0 | 0 | 0 | 0 | 0 | 0 | 0 | 0 | 0 | 0 |
| LED 3 | 0 | 0 | 0 | 16 | 33 | 41 | 22 | 0 | 0 | 0 | 0 | 0 | 0 | 0 |
| LED 4 | 0 | 0 | 0 | 0 | 0 | 0 | 11 | 7 | 0 | 0 | 0 | 0 | 0 | 0 |
| LED 5 | 0 | 0 | 0 | 0 | 0 | 0 | 0 | 12 | 13 | 6 | 10 | 0 | 0 | 0 |
| LED 6 | 0 | 0 | 0 | 0 | 0 | 0 | 0 | 0 | 0 | 4 | 25 | 44 | 16 | 0 |
| LED 7 | 0 | 0 | 0 | 0 | 0 | 0 | 0 | 0 | 0 | 0 | 0 | 16 | 20 | 30 |

FIG. 26A

|       | PD1 | PD2 | PD3 | PD4 |
|-------|-----|-----|-----|-----|
| LED 1 | 0   | 0   | 0   | 0   |
| LED 2 | 0   | 0   | 0   | 0   |
| LED 3 | 0   | 0   | 0   | 0   |
| LED 4 | 0   | 0   | 0   | 0   |
| LED 5 | 0   | 0   | 0   | 0   |
| LED 6 | 0   | 0   | 0   | 0   |
| LED 7 | 0   | 0   | 0   | 0   |

. . .

|       | PD20 | PD21 | PD22 | PD23 |
|-------|------|------|------|------|
| LED 1 | 0    | 0    | 0    | 0    |
| LED 2 | 0    | 0    | 0    | 0    |
| LED 3 | 0    | 0    | 0    | 0    |
| LED 4 | 0    | 0    | 0    | 0    |
| LED 5 | 0    | 0    | 0    | 0    |
| LED 6 | 0    | 0    | 0    | 0    |
| LED 7 | 0    | 0    | 0    | 0    |

FIG. 26B

|       | PD1 | PD2 | PD3 | PD4 |
|-------|-----|-----|-----|-----|
| LED 1 | 0   | 0   | 0   | 0   |
| LED 2 | 0   | 0   | 0   | 0   |
| LED 3 | 0   | 45  | 0   | 0   |
| LED 4 | 0   | 76  | 45  | 0   |
| LED 5 | 0   | 0   | 20  | 0   |
| LED 6 | 0   | 0   | 1   | 0   |
| LED 7 | 0   | 0   | 0   | 0   |

FIG. 26C

|       | PD1 | PD2 | PD3 | PD4 |
|-------|-----|-----|-----|-----|
| LED 1 | 0   | 0   | 0   | 0   |
| LED 2 | 0   | 0   | 0   | 0   |
| LED 3 | 0   | 5   | 0   | 0   |
| LED 4 | 0   | 15  | 25  | 0   |
| LED 5 | 0   | 0   | 5   | 0   |
| LED 6 | 0   | 0   | 0   | 0   |
| LED 7 | 0   | 0   | 0   | 0   |

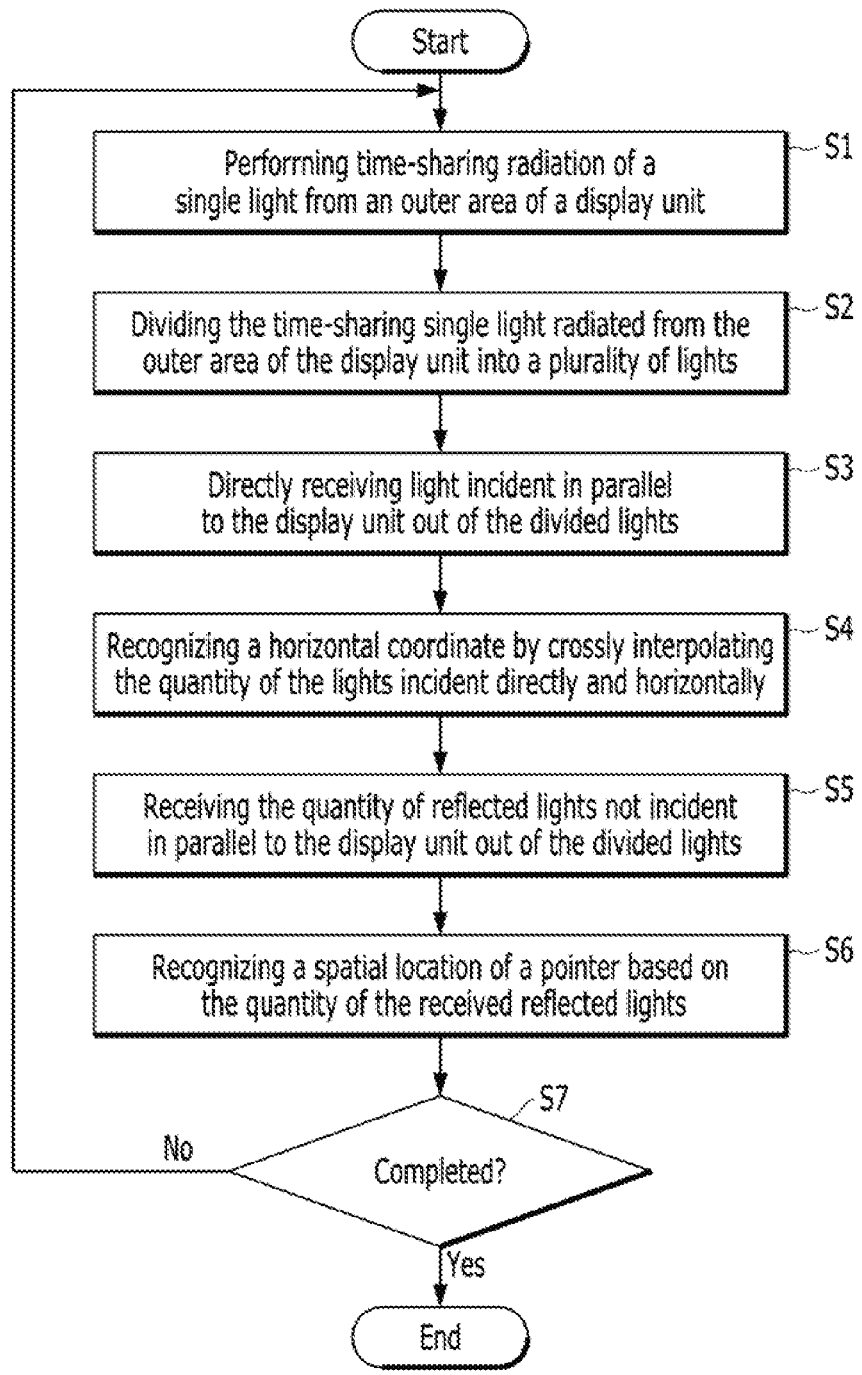

ELECTRONIC DEVICE FOR SENSING 2D AND 3D TOUCH AND METHOD FOR CONTROLLING THE SAME

CROSS-REFERENCE TO RELATED APPLICATIONS

Pursuant to 35 U.S.C. §119(a), this application claims the benefit of earlier filing date and right of priority to Korean Patent Applications Nos. 10-2014-0077872, filed on Jun. 25, 2014, 10-2014-0079458, filed on Jun. 27, 2014 and 10-2014-0079459, filed on Jun. 27, 2014, the contents of which are all hereby incorporated by reference herein in their entirety.

BACKGROUND OF THE DISCLOSURE

1. Field of the Disclosure

Embodiments of the present disclosure relates to an electronic device having a function for sensing 2D and 3D touch and a method for controlling the same.

2. Discussion of the Related Art

With recent development of touch recognition technology and 3D display technology, researches on technology for enabling users to have access to electronic devices 3-dimensionally, in other words, 3D interaction are in progress actively. Such 3D interaction has a core technology. The core technology is space recognition technology for sensing X-Y axis input on a conventional touch screen as touch input and sensing Z axis input on the conventional touch screen as touch input simultaneously.

For conventional 2D touch, a side view light emitting element and a side view light receiving element are arranged and light emitted from the light emitting element is controlled, using a light guide, only to irradiate an invisible infrared light to a display screen.

When a pointer (e.g., a user's finger and a pen) is put on the display screen, light may not pass through the display screen and 2D touch is recognized accordingly. Such 2D touch can realize only simple touch and it is impossible for the user to manipulate the 2D touch at a long distance. To solve such a disadvantage of the 2D touch, 3D touch technology has developed. For the 3D touch (e.g., a gesture), a topview light emitting element and a topview light receiving element are arranged. When a pointer (e.g., a user's finger and a pen) approaches to a display screen, the light receiving element recognizes a reflected light and the location of the pointer is figured out accordingly.

Therefore, the 2D touch manner and the 3D touch manner are different from each other such that they may have to be manufactured independently and require much space and high cost disadvantageously. In addition, the light emitting element used in the 3D touch has a limited radiation angle and a deadzone where touch recognition is impossible might be generated in a display region.

There is much need for development of an electronic device having 2D and 3D touch function for sensing 2D and 3D touch precisely and accurately.

SUMMARY OF THE DISCLOSURE

An object of the present disclosure is to solve the problems and disadvantages mentioned here above. Another object of the present disclosure is to provide an electronic device having a 2D and 3D touch function which may precisely and accurately sense 2D and 3D touch of a pointer, without a deadzone, by arranging a light isolation unit for isolating a first light for sensing 2D touch and a second light for sensing 3D touch lights incident from a light emitting unit, and a method for controlling the same.

To achieve these objects and other advantages and in accordance with the purpose of the disclosure, as embodied and broadly described herein, an electronic device having a function for sensing 2D and 3D touch includes a display unit; a bezel frame unit configured to surround an edge area of the display unit; a plurality of light emitting units arranged in the bezel frame unit, spaced apart a first distance from each other; a plurality of light receiving units arranged in the bezel frame unit, spaced apart a second distance from each other; a light isolation unit located in a direction in which the light emitted from the light emitting units travels, the light isolation unit configured to isolate a first light for sensing 2D touch and a second light for sensing 3D touch from the lights incident thereon from the light emitting units; a driving control unit configured to sequentially operate the plurality of the light emitting units based on a preset time period; and a motion recognition unit configured to calculate a horizontal coordinate by detecting and compensating the quantity of the first light, to calculate a spatial coordinate by detecting the quantity of the second light reflected from a preset pointer, to extract a motion of the pointer based on the detected quantity of the light and to implement an operation corresponding to the extracted motion.

The driving control unit may sequentially operate the plurality of the light emitting units in a clockwise or counter-clockwise direction based on an order of arrangement of the light emitting units.

The motion recognition unit may include a detector configured to detect the quantity of the light reflected from the pointer through the light receiving unit; a noise eliminator configured to eliminate a noise light which belongs to the other wavelength range except a preset wavelength range from the quantity of the detected light; a coordinate calculator configured to calculate a X-coordinate, a Y-coordinate and a Z-coordinate based on the quantity of the light having the noise light eliminated therefrom; a motion extractor configured to extract a motion of the pointer based on the coordinate of the pointer; and a controller configured to control the detector, the noise eliminator, the coordinate calculator and the motion extractor, and to implement an operation corresponding to the extracted motion.

After calculating a horizontal coordinate by detecting and compensating the quantity of the first light, the coordinate calculator may detect the quantity of the second light reflected from the pointer and calculates a spatial coordinate based on the detected quantity of the second light.

The coordinate calculator may crossly interpolate the quantity of the first light received from the light emitting units facing each other.

In another aspect of the present disclosure, a method for controlling an electronic device including a plurality of light emitting units, a plurality of light receiving units and a light isolation unit, having a function for sensing 2D and 3D touch, the method includes sequentially operating the plurality of the light emitting units based on a preset time period; isolating a first light for sensing 2D touch and a second light for sensing 3D touch from the light incident thereon from the light emitting units; directly receiving the first light for sensing 2D; calculating a horizontal coordinate by detecting and compensating the quantity of the received first light; receiving a light reflected from a preset pointer out of the second lights for sensing 3D touch; and extracting a motion of the pointer based on the quantity of the extracted light by detecting the quantity of the received second light and calculating a spatial coordinate, and implementing an operation corresponding to the extracted motion.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

Arrangements and embodiments may be described in detail with reference to the following drawings in which like reference numerals refer to like elements and wherein:

FIGS. 9A, 9B, 10A, 10B and 11 are diagrams illustrating an arrangement relation between a light isolation unit and a light emitting unit in accordance with the present disclosure;

FIGS. 25A and 25B are diagrams illustrating the quantity data of the first light for sensing 2D which is received by the light receiving unit;

FIGS. 26A, 26B and 26C are diagrams illustrating the light quantity data of the second light for sensing 3D touch which is sensed by the light receiving unit; and FIG. 27 is a flow chart illustrating a method for controlling an electronic device in accordance with the present disclosure.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

An electronic device having a 2D and 3D touch function which is mentioned herein may be a mobile terminal or a stationary terminal.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Examples of the stationary terminal include digital TVs, desktop computers and digital signage.

Figure 1:
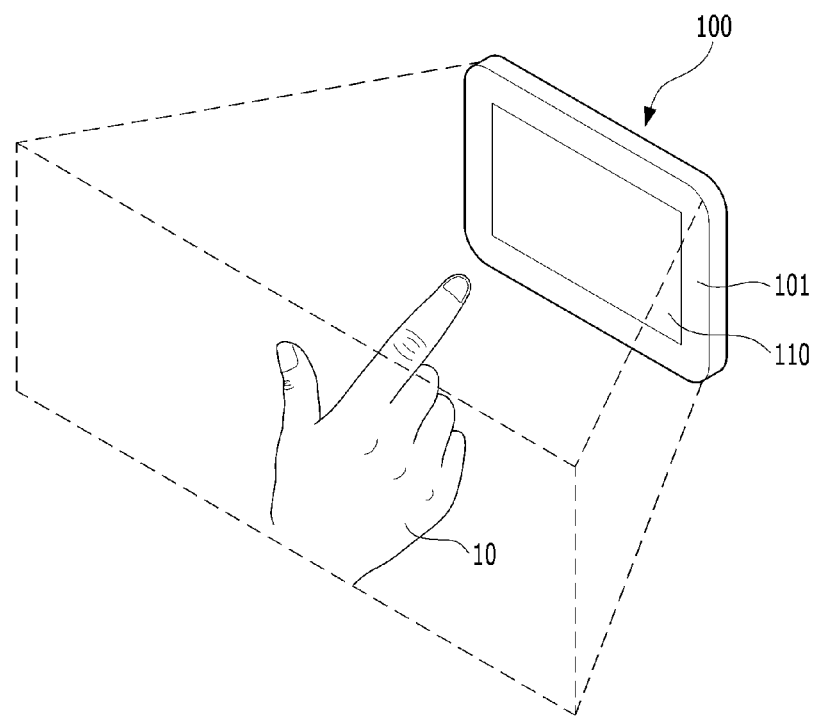
FIG. 1 is a diagram illustrating a 2D and 3D touch function of an electronic device in accordance with one embodiment of the present disclosure.
Figure 2:
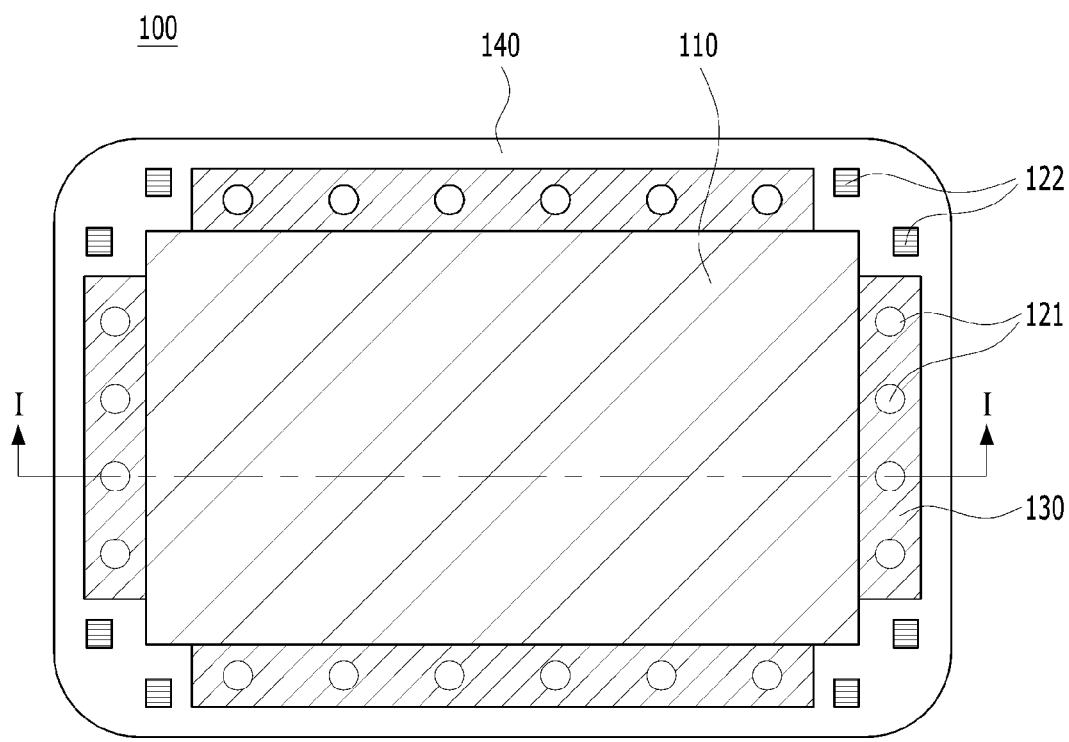
FIG. 2 is a plane view illustrating an inner structure of an electronic device in accordance with one embodiment of the present disclosure.
Figure 3:
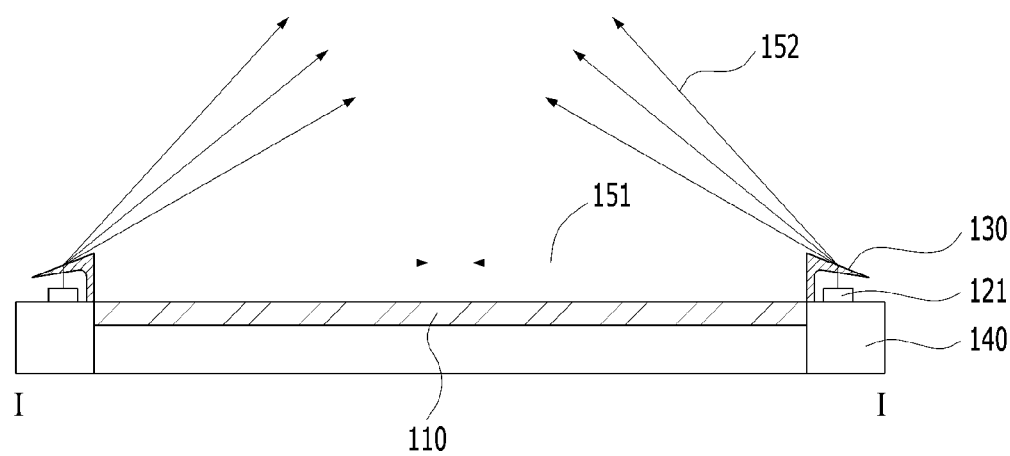
FIG. 3 is a sectional diagram along I-I line of FIG. 2.

FIG. 1 is a diagram illustrating a 2D and 3D touch function of an electronic device in accordance with one embodiment of the present disclosure. FIG. 2 is a plane view illustrating an inner structure of an electronic device in accordance with one embodiment of the present disclosure. FIG. 3 is a sectional diagram along I-I line of FIG. 2.

The electronic device 100 in accordance with the present disclosure shown in FIGS. 1 through 3 may include a display unit 110, a light emitting unit 121, a light receiving unit 122, a light isolation unit 130, a bezel frame unit 140 and a motion recognition unit (not shown).

The display unit 110 may display the information processed in the electronic device 100.

For example, in case the electronic device 100 is a navigation system, UI (User Interface) or GUI (Graphic User Interface) is displayed.

As shown in FIG. 1, the display unit 110 may configurate most of a front surface area of the electronic device in accordance with the present disclosure.

The display unit 110 may include at least one of a liquid crystal display (LCD), a thin film transistor-liquid crystal display (TFT LCD), an organic light-emitting diode (OLED), a flexible display and a 3D display.

The bezel frame unit 140 is configured to surround an edge area of the display unit 110.

The bezel frame unit 140 shown in FIG. 2 may have a similar profile to the display unit 110.

Accordingly, the bezel frame unit 140 is arranged to surround the edge of the display unit 110. As the case may be, the bezel frame unit 140 may be partially overlapped with the edge of the display unit 110.

In case the bezel frame unit 140 is provided in front of the display unit 110, a hole may be formed in the bezel frame unit 140 to expose the display unit 140 there through.

The bezel frame unit 140 may be one of inner frames provided in the electronic device 100 in accordance with the present disclosure.

For example, an exterior appearance of the front surface provided in the electronic device 100 shown in FIG. 1 may be defined by a front case 101 and the bezel frame unit 140 may be provided in the front case 101.

In one embodiment, the bezel frame unit 140 may compose a LCD module provided in the display unit 110.

In this instance, the bezel frame unit 140 may support a LCD panel and an outer portion of a backlight unit arranged under the LCD panel, to couple the LCD panel and the backlight unit to each other.

Also, the bezel frame unit 140 may be integrally formed with a printed circuit board for driving the light emitting unit 121 and the light receiving unit 122 if necessary. Alternatively, the bezel frame unit 140 may be a case which defines an exterior appearance of the electronic device 100.

The bezel frame unit 140 may include a plurality of light emitting units 121 arranged apart a first distance and a plurality of light receiving units 122 arranged apart a second distance.

The first distance between each two of the light emitting units 121 may be narrower than the second distance between each two of the light receiving units 122.

At this time, the light emitting units 121 may be more than the light receiving units 122.

Alternatively, the first distance between each two of the light emitting units 121 may be broader than the second distance between each two of the light receiving units.

At this time, the light emitting units 121 may be smaller than the light receiving units 122.

As shown in FIG. 2, the light emitting units 121 and the light receiving units 122 may be provided along a rime portion of the display unit 110 and they may form a kind of a photo-sensor module array for surrounding the display unit 110.

Each of the light emitting units 121 may irradiate light and the irradiated light is reflected from a pointer 10 spaced apart from the display unit 110. When the irradiated light is reflected, each of the light receiving units 122 may receive the reflected light.

As shown in FIG. 1, when the user's finger as the pointer 10 is located in an area where the light is irradiated from the plurality of the light emitting units 121, spaced apart from the display unit 110 located under the user's finger, the light emitted from the light emitting units 121 may be reflected by the pointer 10 and incident on the light receiving units 122.

Once the reflected light is incident, the motion recognition unit may recognize the pointer 10 located in front of the display unit 110 and detect the quantity of the reflected light simultaneously. After that, the motion recognition unit may expect a distance between the pointer 10 and the display unit 110 based on the detected quantity of the light.

The motion recognition unit may extract motion of the pointer 10 based on the detected light quantity and perform an operation corresponding to the extracted motion.

In other words, when the light receiving unit 122 senses the pointer 10 approaching the display unit 110, the motion recognition unit may analyze the motion of the pointer 10 and perform an operation designated to each of motions.

Examples of the performed operations may include changing of an output screen on the display unit 110, controlling of a sound output from the electronic device 100 and on/off of the electronic device 100.

Each of the operations may be pre-stored, corresponding to a specific motion. The motion recognition unit may search the extracted motion of the pointer from the pre-stored motions and perform an operation corresponding to the searched motion.

Through hardware implementation, the embodiments described herewith may be realized, using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays, processors, controllers, Micro-controllers, microprocessors and electronic units for performing other functions.

In some cases, the embodiments described in the present disclosure may be realized by the motion recognition itself.

Through software implementation, the embodiments described in the present disclosure such as procedures and functions may be realized by auxiliary software modules.

Each of the software modules may implement one or more functions and operations described in the present disclosure.

A software code may be realized by a software application written in a proper program language. The software code may be stored in a memory and implemented by a control unit.

Meanwhile, each of the light emitting units 121 may irradiate light and configurate a kind of a light emitting unit array.

For example, the light emitting unit 121 may be a light emitting diode (LED) which emits an infrared red light.

Each of the light emitting units 121 may be mounted in a printed circuit board formed on the bezel frame unit 140 and irradiate light toward a front of the display unit 110 based on control of the printed circuit board.

When each of the light emitting units 121 irradiates light, the lights irradiated from the light emitting units 121 may have different radial angles, respectively, based on the type of the light emitting units 121.

As the radial angle is getting larger, the light emitted from one light emitting unit 121 may be irradiated to a broader region.

The light receiving units 122 may receive the light reflected by a predetermined pointer 10 after irradiated from the light emitting units 121 and it may convert the quantity of the reflected light into an electrical signal.

The light receiving unit 122 may include an infrared ray sensor, a photo diode and a photo transistor, and it may generate an electrical signal corresponding to the quantity of the received light.

Also, the light receiving unit 122 may be mounted in the printed circuit board formed on the bezel frame unit 140, and it may be electrically connected with the motion recognition unit to transmit an electrical signal to the motion recognition unit.

In this embodiment, the plurality of the light emitting units 121 may be corresponding to one light receiving unit 122 and the one light receiving unit 122 and the plurality of the light emitting units 121 corresponding to the one light receiving unit 122 may form one photo sensor module.

As mentioned above, the plurality of the light emitting units 121 and light receiving units 122 may be provided in the bezel frame unit 140.

The light received by one specific light receiving unit 122 may be light reflected by the pointer 10 after irradiated from one of the light emitting units 121 or the light directly emitted from one of two facing light emitting units 121.

As the case may be, the light emitting units 121 may be overlappedly arranged under an edge area of the display unit 110.

Alternatively, the light emitting units 121 and the display unit 110 may be arranged on different lines, respectively.

A light filter unit (not shown) may be arranged on the light receiving units 122 to filter light in a specific wavelength range.

As a noise light in a different wavelength range is shut off, 2D and 3D touch of the pointer can be sensed precisely and accurately.

Next, the light isolation unit 130 may be located in a traveling direction of the light generated from the light emitting units 121. The light isolation unit 130 may isolate a first light 151 for sensing 2D touch and a second light 152 for sensing 3D touch from the lights incident from the light emitting unit 121.

The light isolation unit 130 may formed of at least one of acryl resin based materials including PMMA (Polymethylmethacrylate), PET (polyethylene terephthlate), COC (Cyclic Olefin Copolymers), PEN (polyethylene naphthalate), PC (Polycarbonate), PS (Polystyrene) and MS (Mathacylate styrene).

A refractive index of the light isolation unit 130 may be approximately 1.3~1.55 and a light transmittance of the light isolation unit 130 may be approximately 80~99%.

The light isolation unit 130 may include an incident surface for transmitting the light incident thereon from the light emitting units 121 and at least one isolating surface for transmitting some of the light having transmitted the incident surface in a first direction and reflecting the other of the light in a second direction.

At this time, an angle formed between the incident surface and the isolating surface of the light isolation unit 130 may be an acute angle.

The reason why the angle is an acute angle is that an isolating angle between the first light 151 for sensing 2D touch and the second light 152 for sensing 3D touch can be increased.

The quantity of the first light 151 for sensing 2D touch may be different from the quantity of the second light 152 for sensing 3D touch.

For example, the quantity of the second light 152 for sensing 3D touch may be larger than the quantity of the first light 151 for sensing 2D touch.

To prevent the deadzone from being generated in an upper area of the display unit 110, the light is diffused upwardly and a broader touch area is provided. Accordingly, even the motion of the pointer located in a long distance may be extracted precisely and accurately.

In addition, the first light 151 for sensing 2D touch may travel in parallel with respect to the screen of the display unit 110.

The second light 152 for sensing 3D touch may travel in a direction inclined a preset angle from the screen of the display unit 110.

The light isolation unit 130 may be arranged on the light emitting units 121 to cover the light emitting unit 121.

As the case may be, the light isolation unit 130 may be arranged in an area between the light emitting units 121 and the display unit 110.

For example, the light isolation unit 130 may be divided into a plurality of portions arranged corresponding to lateral surfaces of the display units 110. The divided portions of the light isolation unit 130 may be spaced apart a preset distance from each other.

Alternatively, some of the divided light isolation portions 130 may be arranged on the light emitting unit 121 to cover the light emitting unit 121 and other divided light isolation portions 130 may be arranged in an area between the light emitting unit 121 and the display unit 110.

Or, the divided light isolation portions 130 may be integrally formed with each other along lateral surfaces of the display unit 110 in series to cover an edge area of the display unit 110.

If necessary, the light isolation unit 130 may further include at least one full reflection surface for full-reflecting the light transmitted through the incident surface to the isolating surface.

The light isolation unit 130 may cover a front surface of the light emitting unit 121, in contact with the light emitting unit 121.

In the present disclosure, the light isolation unit 130 is arranged to isolate the first light 151 for sensing 2D touch and the second light 152 for sensing 3D touch from the lights incident from the light emitting units 121, such that 2D and 3D of the pointer can be sensed precisely and accurately, without the deadzone.

FIGS. 4 through 8 are diagrams illustrating arrangement of a light isolation unit in accordance with the present disclosure.

As shown in FIGS. 4 through 8, the light isolation unit 130 may be located in a travelling direction of the light generated from the light emitting unit 121.

Figure 4:
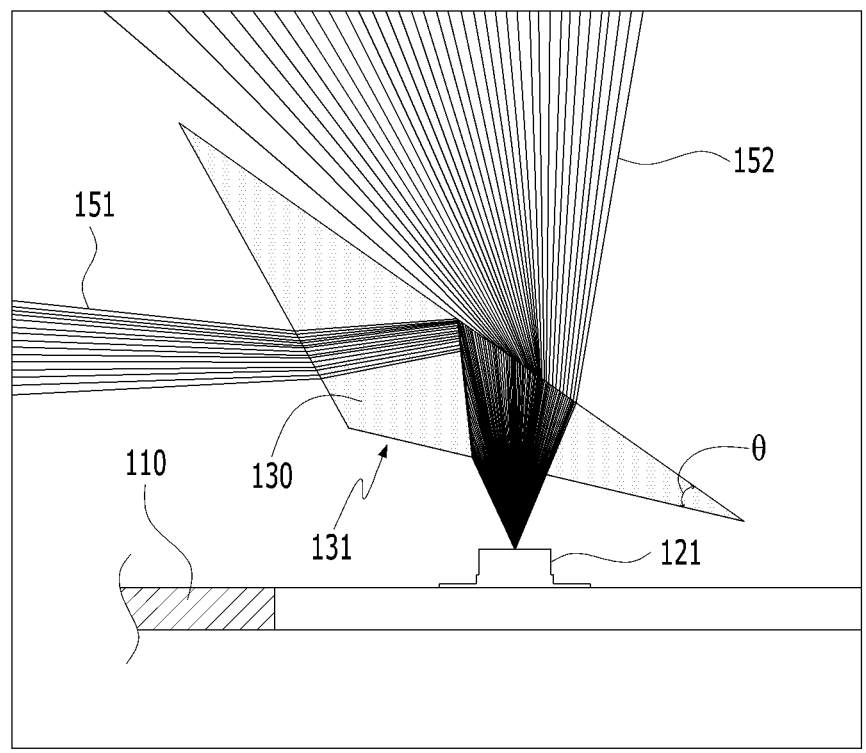
FIGS. 4 through 8 are diagrams illustrating arrangement of a light isolation unit in accordance with the present disclosure.

For example, in case the light emitting unit 121 is a topview light emitting element as shown in FIG. 4, the light isolation unit 130 may be arranged on the light emitting unit 121 to cover the light emitting unit 121 and face a light emitting surface of the light emitting unit 121.

In this instance, the light isolation unit 130 may be spaced apart a preset distance from the light emitting units 121.

In other words, the incident surface of the light isolation unit 130 may be spaced apart a preset distance from the light emitting surface of the light emitting unit 121.

Figure 5:
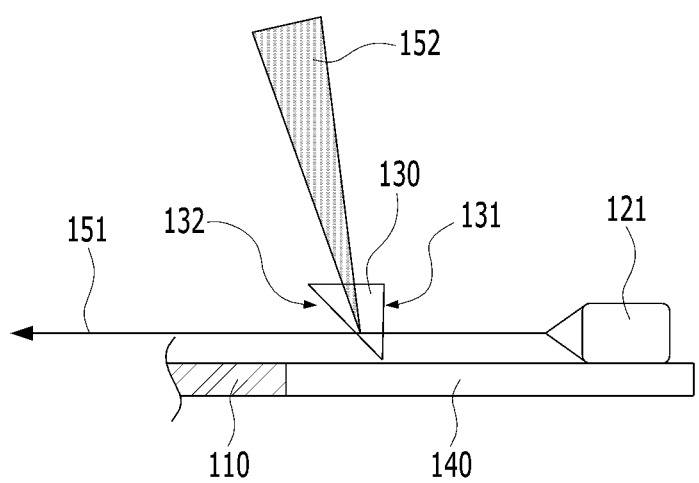

In case the light emitting unit 121 is a sideview light emitting element as shown in FIG. 5, the light isolation unit 130 may be located in the area between the light emitting unit 121 and the display unit 110 to face the light emitting surface of the light emitting unit 121.

Even in this instance, the light isolation unit 130 may be spaced apart a preset distance from the light emitting unit 121.

Specifically, the incident surface 131 of the light isolation unit 130 may be spaced apart a preset distance from the light emitting surface of the light emitting unit 121.

Figure 6:
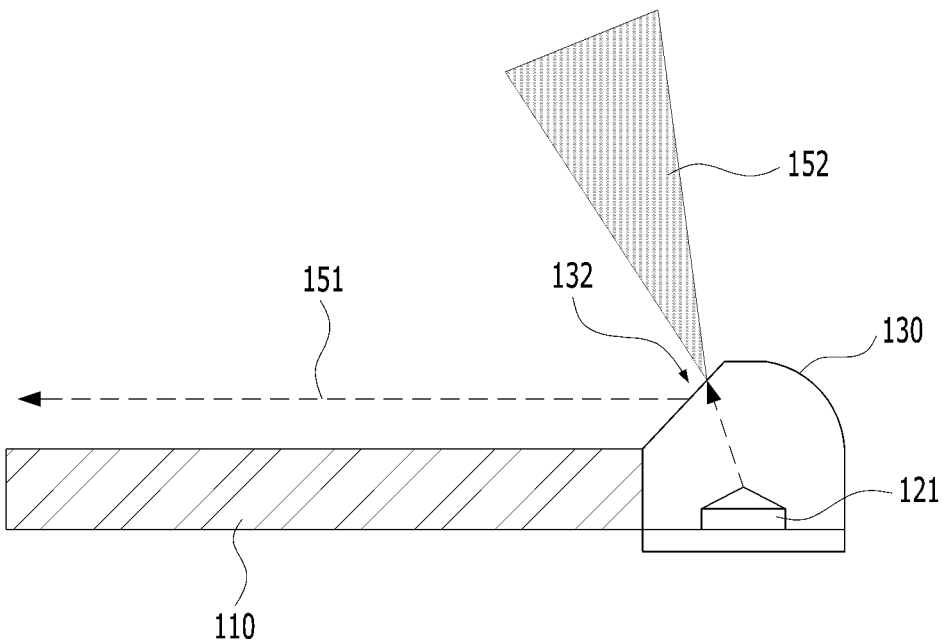

As shown in FIG. 6, the light isolation unit 130 may cover the front surface of the light emitting unit 121, in contact with the light emitting unit 121.

In other words, the light isolation unit 130 and the light emitting unit 121 may be integrally formed with each other.

The light isolation unit 130 may include only the light isolating surface 132 and no incident surface, and it may directly isolate the first light 151 for sensing 2D and the second light 152 for sensing 3D touch from the lights incident from the light emitting unit 121.

The light emitting unit 121 integrally formed with the light isolation unit 130 may be located lower, not on the same line with the screen of the display unit 110.

In other words, the light emitting unit 121 and the display unit 110 may be arranged on different lines, respectively.

However, the isolating surface 132 of the light isolation unit 130 may be located on the same line with the screen of the display unit 110.

The reason why the isolating surface 132 and the screen of the display unit 110 are located on the same line is that the isolated first light 151 for sensing 2D can travel in parallel to the screen of the display unit 110.

Figure 7:
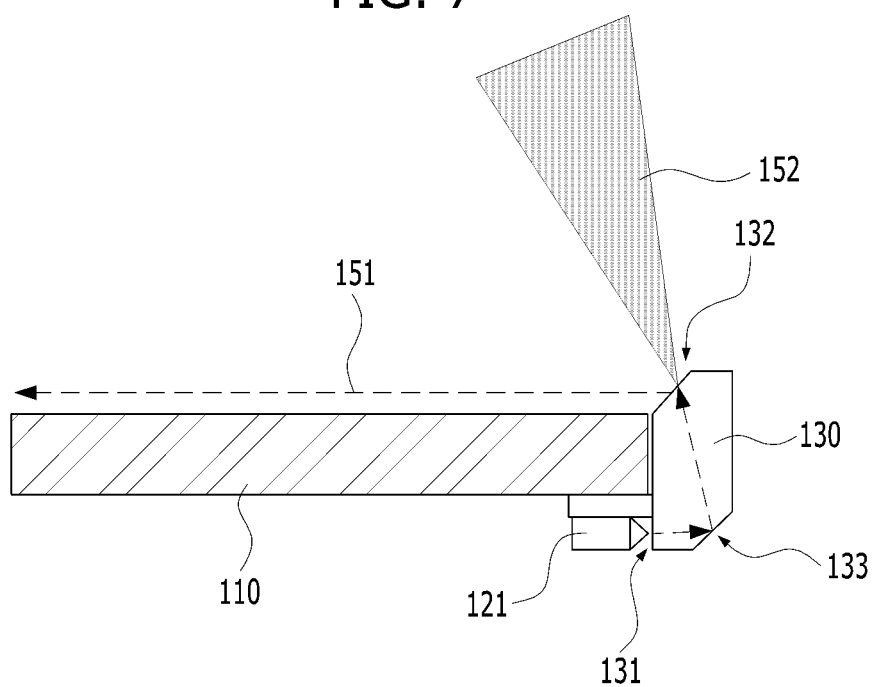

As shown in FIG. 7, the light isolation unit 130 may be located in a lateral surface of the display unit 110 and the light emitting unit 121 may be overlappedly arranged under the edge area of the display unit 110.

In this instance, the light isolation unit 130 may be arranged apart a preset distance from the light emitting units 121.

In other words, the incident surface 131 of the light isolation unit 130 may be spaced apart a preset distance from the light emitting surface of the light emitting unit 121.

At this time, the light emitting unit 121 may be a sideview light emitting element.

The light isolation unit 130 may be located, with facing the incident surface 131, and it may further include at least one full reflection surface 133 for fully reflect the light transmitted through the incident surface 131 toward the isolating surface 132.

The isolating surface 132 of the light isolation unit 130 may be located on the same line with the screen of the display unit 110.

The reason why the isolating surface 132 is located on the same line with the screen of the display unit 110 is to travel the isolated first light 151 for sensing 2D in parallel to the screen of the display 110 from the isolating surface 132.

The light emitting unit 121 is arranged under the display unit 110 and the light isolating surface 130 shown in FIG. 7 may reduce the region of the bezel frame unit.

Figure 8:
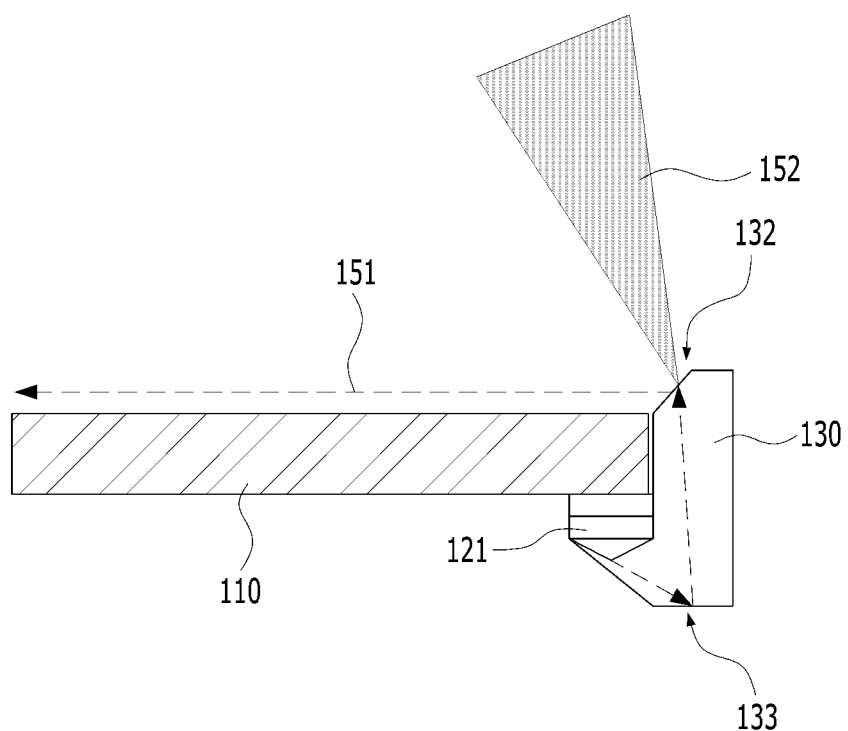

Alternatively, the light isolating unit 130 shown in FIG. 8 may be located in a lateral surface of the display unit 110 and the light emitting unit 121 may be overlappedly arranged under an edge area of the display unit 110.

In this instance, the light isolation unit 130 may cover a front surface of the light emitting unit 121, in contact with the light emitting unit 121.

In other words, the light isolation unit 130 and the light emitting unit 121 may be integrally formed with each other as one body.

At this time, the light emitting unit 121 may be a topview light emitting element.

The light isolation unit 130 is located, with facing the incident surface 131, and it may further include at least one full reflection surface 133 for fully reflecting the light transmitted through the incident surface 131 toward the isolating surface 132.

The isolating surface 132 of the light isolation unit 130 may be located on the same line with the screen of the display unit 110.

The reason why the isolating surface 132 is located on the same line with the screen of the display unit 110 is to travel the isolated first light 151 for sensing 2D touch in parallel to the screen of the display unit 110 from the isolating surface 132 of the light isolation unit 130.

The light isolation unit 130 shown in FIG. 8 may also reduce the area of the bezel frame unit, as the light emitting unit 121 is arranged under the display unit 110.

FIGS. 9A, 9B, 10A, 10B and 11 are diagrams illustrating an arrangement relation between a light isolation unit and a light emitting unit in accordance with the present disclosure.

As shown in FIGS. 9A, 9B, 10A, 10B and 11, the light isolation unit 130 may be located in a direction in which the light generated from the light emitting unit 121 travels, to isolate the first light 151 for sensing 2D touch and the second light 152 for sensing 3D touch from the lights incident from the light emitting unit 121.

Figure 9A:
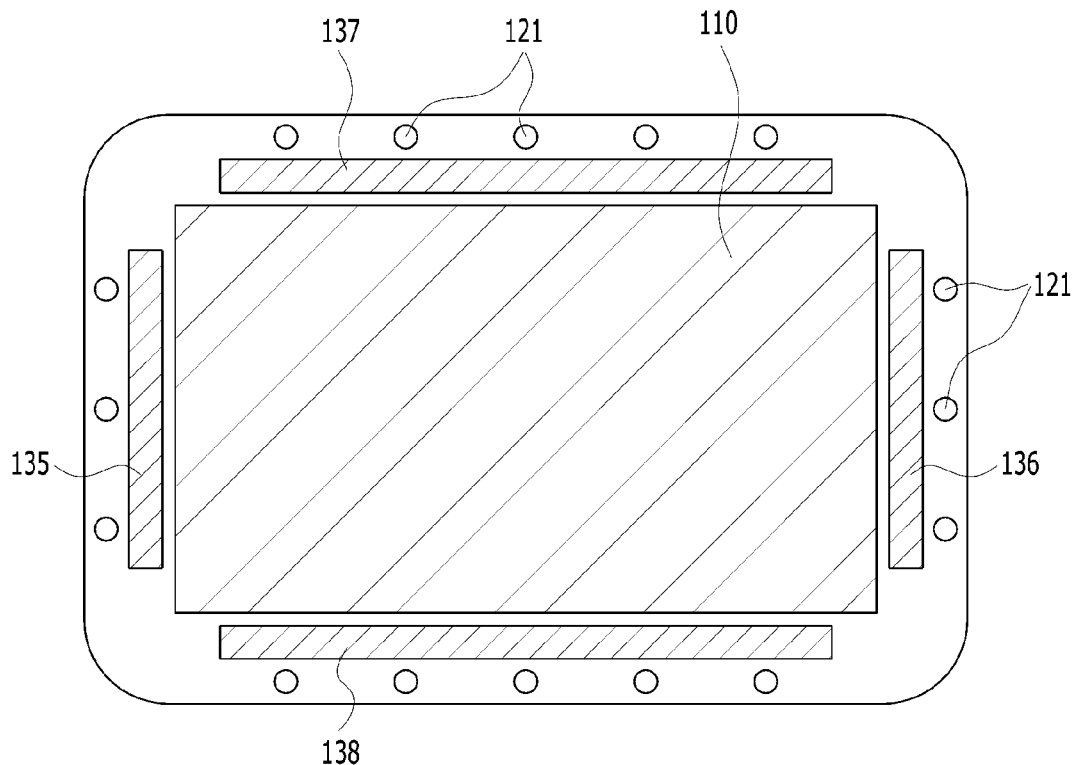

As shown in FIG. 9A, the light isolation unit 130 may be a detachable type.

In other words, the light isolation unit 130 may include first, second, third and fourth light isolation parts 135, 136, 137 and 138 corresponding to lateral surfaces of the display unit 110, respectively. The first, second, third and fourth light isolation parts 135, 136, 137 and 138 may be spaced apart a preset distance from each other.

The detachable light isolation unit 130 shown in FIG. 9A is arranged only in an area where the light emitting unit 121 is located and it has an advantage of a reduced manufacture cost.

At this time, the first, second, third and fourth light isolating units 135, 136, 137 and 138 may be arranged on the light emitting unit 121 and the light emitting unit 121 may be a topview light emitting element.

Figure 9B:
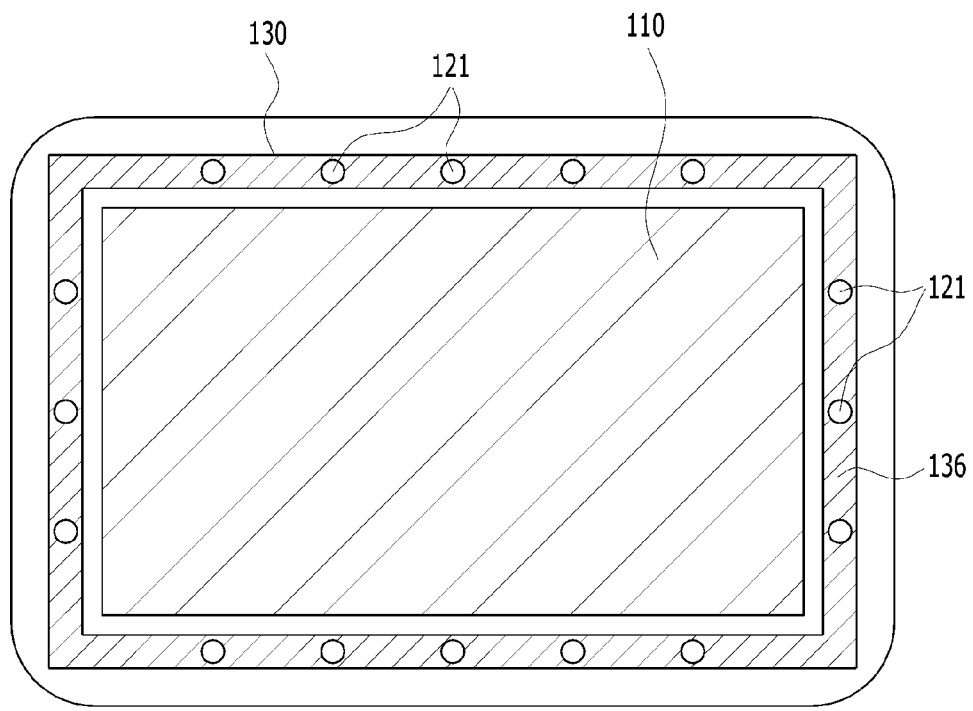

As the case may be, the light isolation unit 130 shown in FIG. 9B may be an integral type.

In other words, the light isolation unit 130 may be continuously arranged along lateral surfaces of the display unit 110 to surround an edge area of the display unit 110.

The integral type light isolation unit 130 shown in FIG. 9B may be arranged to surround an edge area of the display unit 110 and it has an advantage of simple manufacture.

At this time, the first, second, third and fourth light isolation parts 135, 136, 137 and 138 may be arranged on the light emitting unit 121 and the light emitting unit 121 may be a topview light emitting element.

Figure 10A:
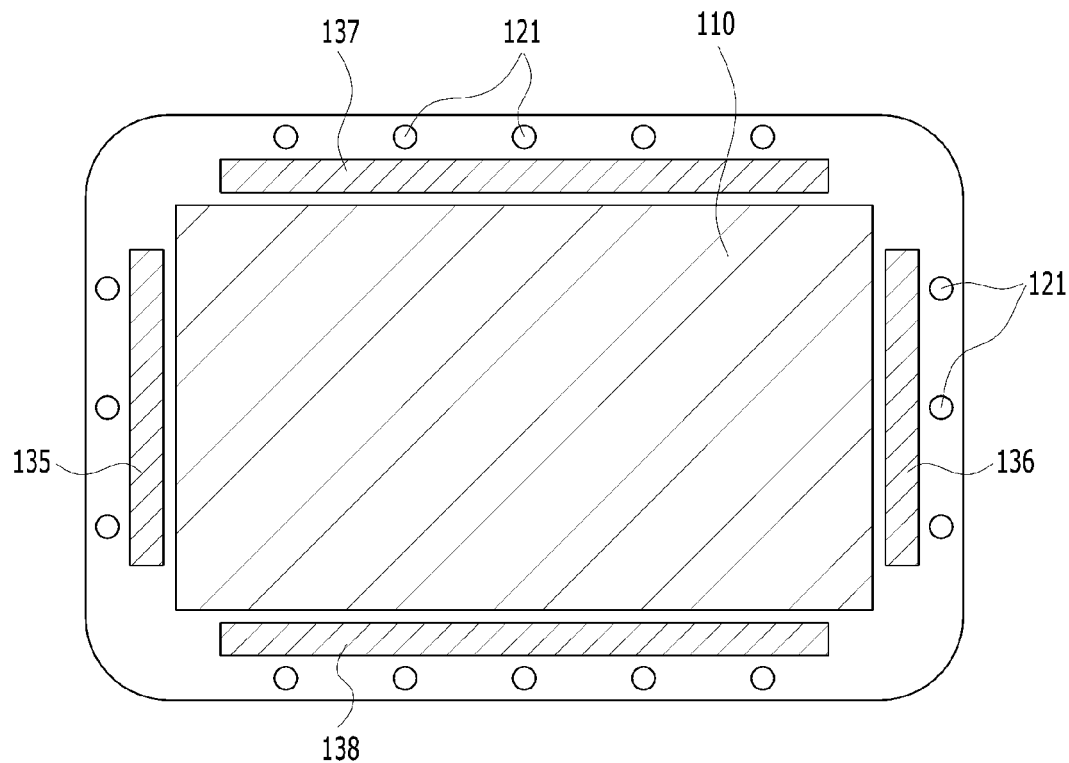
Figure 10B:
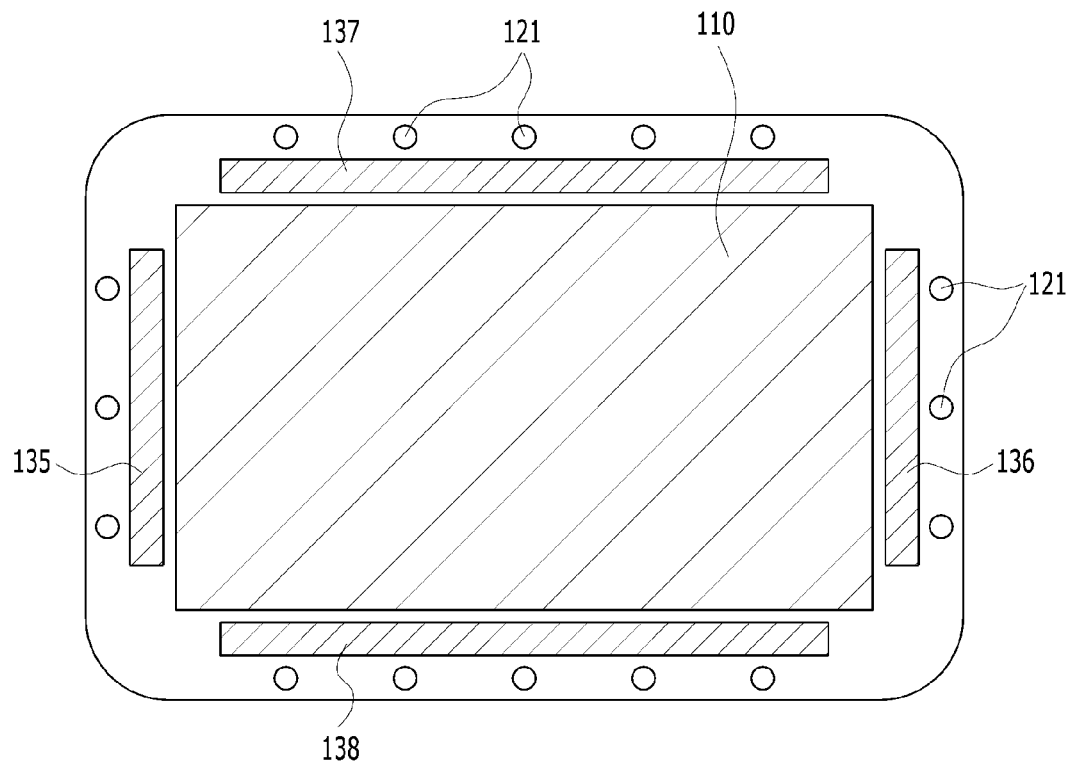

Alternatively, as shown in FIGS. 10A and 10B, the light isolation unit 130 may be arranged in an area disposed between the light emitting unit 121 and the display unit 110.

The light emitting unit 121 may be a sideview light emitting element.

FIG. 10A shows a detachable type light isolation unit 130 and FIG. 10B shows an integral type light isolation unit 130.

Alternatively, as shown in FIG. 11, some of the light isolation unit 130 may be arranged on the light emitting unit 121 to cover the light emitting unit 121 and others of the light isolation unit 130 may be arranged in an area between the light emitting unit 121 and the display unit 110.

For example, the light isolation unit 130 may include first, second, third and fourth light isolation parts 135, 136, 137 and 138 corresponding to lateral surfaces of the display unit 110, respectively. The first, second, third and fourth light isolation parts 135, 136, 137 and 138 may be spaced apart a preset distance from each other.

The first and second light isolation units 135 and 136 may be arranged in the area between the light emitting unit 121 and the display unit 110. The light emitting unit 121 may be a sideview light emitting element.

The third and fourth light isolation units 137 and 138 may be arranged on the light emitting unit 121. The light emitting unit 121 may be a topview light emitting element.

As the case may be, the first and second light isolation units 135 and 136 may be arranged on the light emitting unit 121. The light emitting unit 121 may be a topview light emitting element. The third and fourth light isolation units 137 and 138 may be arranged in the area between the light emitting unit 121 and the display unit 110. The light emitting unit 121 may be a sideview light emitting element.

In the present disclosure, the arrangement of the light isolation unit 130 and the light emitting unit 121 can be diversely modified and manufactured.

Figure 12A:
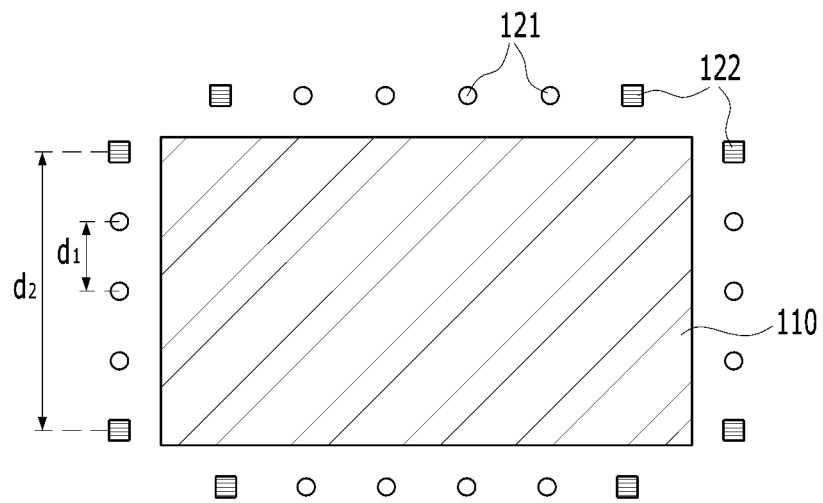
FIGS. 12A, 12B, 13A, 13B, 13C and 14 are diagrams illustrating an arrangement relation between a light emitting unit and a light receiving unit in accordance with the present disclosure.
Figure 12B:
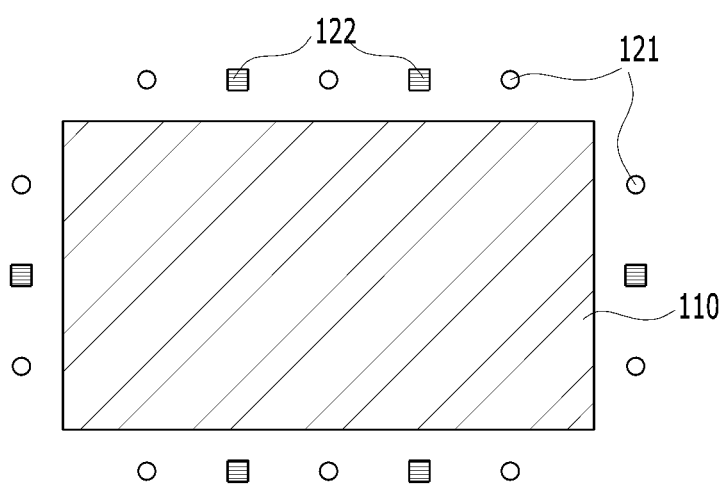
Figure 13A:
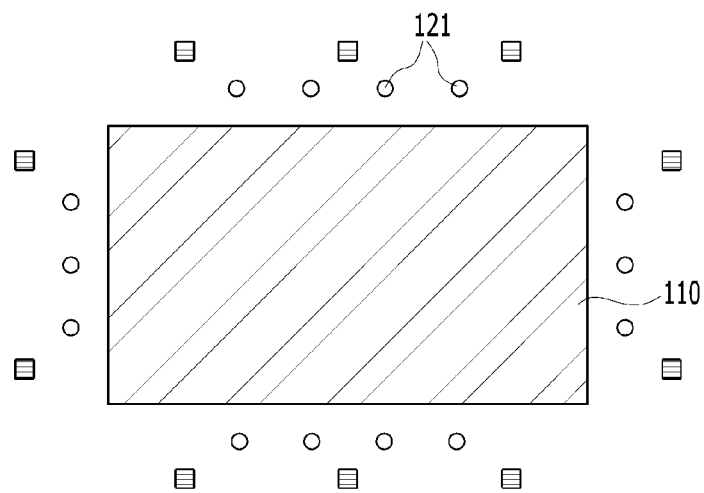
Figure 13B:
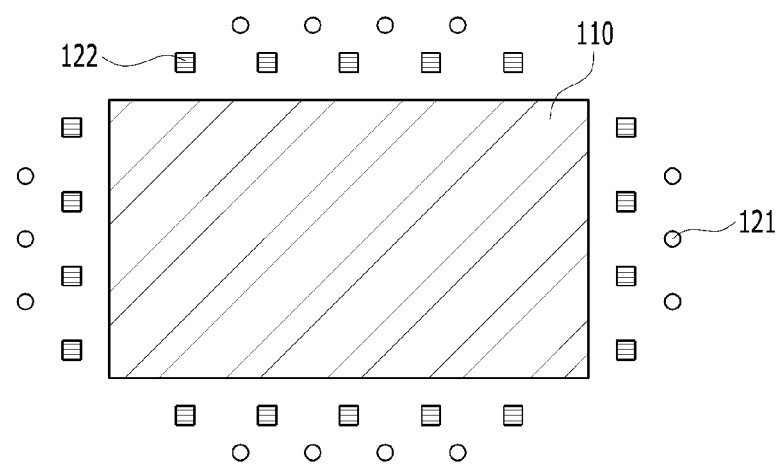
Figure 13C:
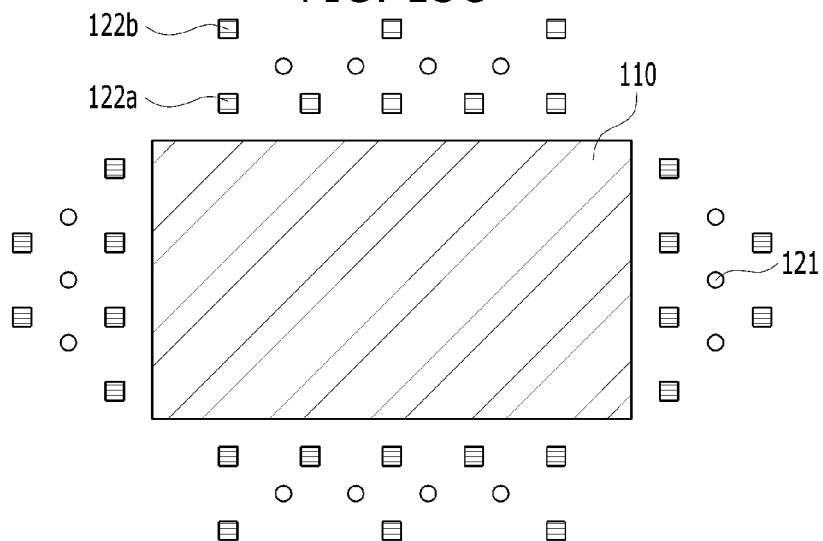
Figure 14:
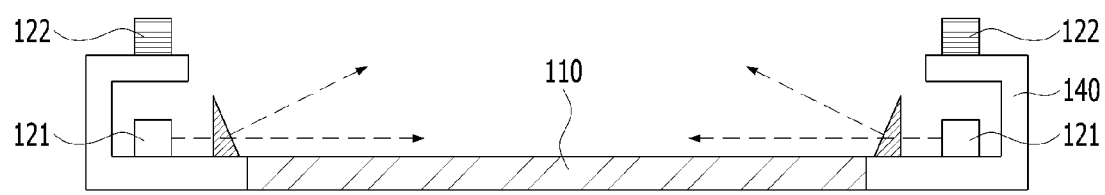

FIGS. 12A, 12B, 13A, 13B, 13C and 14 are diagrams illustrating an arrangement relation between a light emitting unit and a light receiving unit in accordance with the present disclosure. FIGS. 12A, 12B, 13A, 13B and 13C are plane views. FIG. 14 is a sectional diagrams.

As shown in FIGS. 12A, 12B, 13A, 13B, 13C and 14, a plurality of light emitting units 121 and a plurality of light receiving units 122 may be arranged near the display unit 110.

The plurality of the light emitting units 121 may be arranged apart a first distance (d1). The plurality of the light receiving units 122 may be arranged apart a second distance (d2).

At this time, the first distance (d1) between each two of the light emitting units 121 may be narrower than the second distance (d2) between each two of the light receiving units 122.

The number of the light emitting units 121 may be larger than the number of the light receiving units 122.

Alternatively, the first distance (d1) between the light emitting units 121 may be broader than the second distance (d2) between the light receiving units 122.

The number of the light emitting units 121 may be smaller than the number of the light receiving units 122.

Or, the first distance (d1) between the light emitting units 121 may be equal to the second distance (d2) between the light receiving units 122.

In this instance, the number of the light emitting units 121 may be equal to the number of the light receiving units 122.

The plurality of the light emitting units 121 may irradiate light, respectively. For example, the light emitting unit 121 may be a light emitting diode (LED) for emitting infrared light.

The plurality of the light emitting units 121 may irradiate light with the same light output quantity. However, they may irradiate light with different light output quantity.

For example, the light output quantity of the light emitting units 121 arranged in a short axis of the display unit 110 may be higher than the light output quantity of the light emitting units 121 arranged in a long axis of the display unit 110.

That is why a distance between two facing ones of the light emitting units 121 arranged in a long axis of the display 110 is narrower than a distance between two facing ones of the light emitting units 121 arranged in a short axis of the display unit 110.

The light receiving unit 122 may receive the light reflected by a preset pointer 10 after irradiated from each of the light emitting units 121 or ⌐ lights directly emitted from light emitting units facing each other. After that, the light receiving unit 122 convers the quantity of the received light into an electrical signal.

The light receiving unit 122 may include an infrared ray sensor, a photo diode and a photo transistor and it may generate an electrical signal corresponding to the quantity of the received light.

As the case may be, a light filter unit (not shown) may be arranged on the light receiving units 122 to filter light in a specific wavelength range.

As a noise light in a different wavelength range is shut off, 2D and 3D touch of the pointer can be sensed precisely and accurately.

Meanwhile, the light emitting units 121 and the light receiving units 122 may be arranged in diverse methods. As shown in FIGS. 12A and 12B, the light receiving units 122 may be arranged along an arrangement line of the light emitting units 121. As shown in FIG. 12A, a plurality of light emitting units 121 may be arranged between two neighboring light receiving units 122.

In other words, light receiving units 122 may be arranged in both ends of the arrangement line of the light emitting units 121 arranged in a predetermined area of the display unit 110, respectively.

As shown in FIG. 12B, one group of light emitting units 121 may be arranged between two neighboring light receiving units 122.

In other words, each of the light receiving unit 122 may be arranged between light emitting units 121 arranged in a predetermined area of the display unit 110.

The first distance (d1) between the light emitting units 121 shown in FIGS. 12A and 12B may be narrower than the second distance (d2) between the light receiving units 122. The number of the light emitting units 121 may be larger than the number of the light receiving units 122.

Alternatively, as shown in FIGS. 13A, 13B and 13C, the light receiving units 122 may be arranged along another line different from the arrangement line of the light emitting units 121. As shown in FIG. 13A, the arrangement line of the light receiving units 122 may be provided in a predetermined portion adjacent to the arrangement line of the light emitting units 121. Or, as shown in FIG. 13B, the arrangement line of the light receiving units 122 may be provided in the other opposite portion of the arrangement line of the light emitting units 121.

The arrangement line of the light receiving units 122 shown in FIG. 13B may be provided in an area between the light emitting units 121 and the display unit 110.

Alternatively, as shown in FIG. 13C, an arrangement line of first light receiving units 122a may be provided in a predetermined portion adjacent to the arrangement line of the light emitting units 121. An arrangement line of second light receiving units 122b may be provided in the other opposite portion adjacent to the arrangement line of the light emitting units 121.

In other words, the arrangement line of the second light receiving units 122b may be provided in the area between the light emitting units 121 and the display unit 110.

The arrangement line of the first light receiving units 122a may receive the first light for sensing 2D touch and the first light directly emitted from the light emitting units 121 arranged in opposite to the first light receiving units 122a.

The arrangement line of the second light receiving units 122b may receive the second light for sensing 3D touch and the light which is the second light reflected by the pointer.

In this instance, the first light receiving units for sensing 2D touch and the second light receiving units for sensing 3D touch are separately distinguished from each other. Accordingly, the 2D and 3D touch of the pointer may be sensed precisely and accurately.

In another embodiment, the light receiving units 122 shown in FIG. 14 may be arranged along a different line from an arrangement line of the light emitting units 121. The arrangement line of the light receiving units 122 may be provided upper from the arrangement line of the light emitting units 121.

The arrangement line of the light receiving units 122 and the arrangement line of the light emitting units 121 may be overlappedly provided in upper and lower locations, respectively.

In this instance, the bezel frame unit 140 may include a main body to support the light emitting unit 121 and a sub body bent upwardly from an end of the main body to support the light receiving unit 122.

The embodiment shown in FIG. 14 has an advantage of reducing the area of the bezel frame unit 140.

Figure 15:
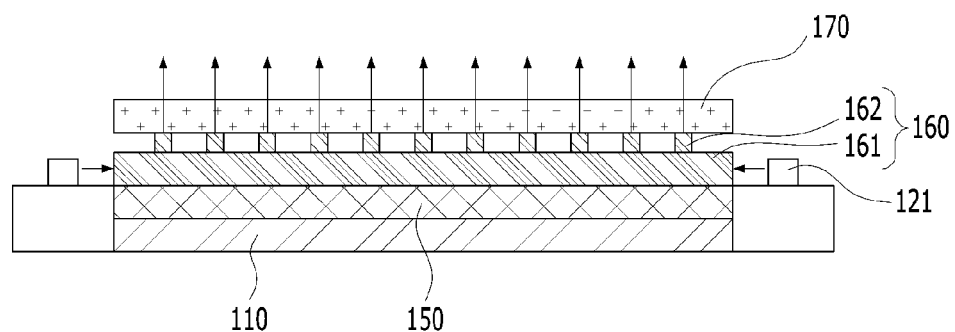
FIG. 15 is a sectional diagram illustrating an electronic device having a light guide unit in accordance with another embodiment.

FIG. 15 is a sectional diagram illustrating another embodiment of the electronic device having a light guide unit arranged therein.

As shown in FIG. 15, the electronic device in accordance with the present disclosure may include a display unit 110, a bezel frame unit 140, a plurality of light emitting units 121, a plurality of light receiving units (not shown) and a light guide unit 160.

The bezel frame unit 140 is arranged to surround an edge area of the display unit 110. The plurality of the light emitting units 121 may be arranged in the bezel frame unit 140, spaced apart a first distance. The plurality of the light receiving units (not shown) may be arranged in the bezel frame unit 140, spaced apart a second distance.

The light guide unit 160 may be arranged on the display unit 110 to guide the light incident from the light emitting units 121 in an upper direction with respect to the display unit 110.

The light guide unit 160 may include a light plate 161 and a plurality of projections 162.

The light plate 161 provided in the light guide unit 160 may have a lateral surface facing the light emitting units 121 to allow the light emitted from the light emitting unit 121 incident thereon.

The plurality of the projections 162 may be projected from a top surface of the light plate 161 and they may diffuse the light incident from the lateral surface of the light plate 161 in an upper direction with respect to the light plate 161.

The light guide unit 160 may be formed of an acryl resin based material such as PMMA (Polymethylmethacrylate), PET (polyethylene terephthlate), COC (Cyclic Olefin Copolymers), PEN (polyethylene naphthalate), PC (Polycarbonate), PS (Polystyrene), or MS (Mathacylate styrene).

A refractive index of the light guide unit 160 may be approximately 1.3~1.55 and a light transmittance of the light guide unit 160 may be approximately 80~99%.

A cover glass 170 may be arranged on the light guide unit 160 and an air gap may be formed between the cover glass 170 and the light plate 161 of the light guide unit 160.

The light guide unit 160 may be spaced apart a preset distance from the display unit 110 and a touch panel 150 may be arranged between the light guide unit 160 and the display unit 110.

A lateral surface of the light plate 161 provided in the light guide unit 160 may face a light emitting surface of the light emitting unit 121, spaced apart a preset distance from the light emitting surface of the light emitting unit 121.

The electronic device shown in FIG. 15 may diffuse the light in an upper direction with respect to the display unit 110 through the light guide unit 160, without the light isolation unit shown in FIG. 2. Accordingly, the electronic device may perform 2D and 3D touch simultaneously.

In this instance, the area of the bezel frame unit 140 can be reduced advantageously.

Figure 16:
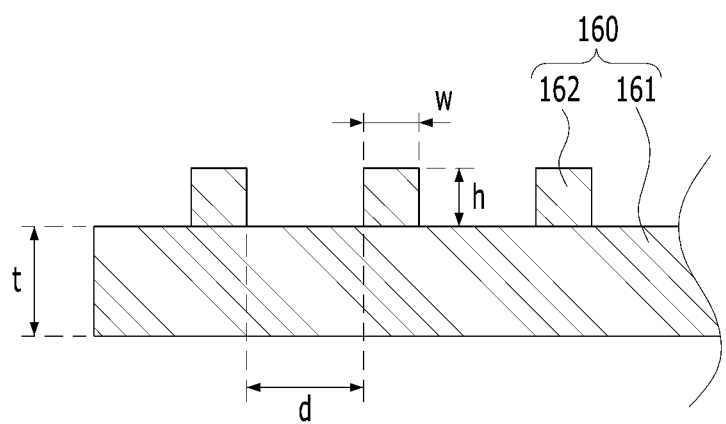
FIG. 16 is a sectional diagram specifically illustrating the light guide unit of FIG. 15.

FIG. 16 is a sectional diagram specifically illustrating the light guide unit shown in FIG. 15.

The light guide unit 160 shown in FIG. 16 may include the light plate 161 and the plurality of the projections 162.

The light plate 161 of the light guide unit 160 may fully reflect and guide the light incident thereon from the light emitting unit 121 toward a central area of the display unit 110.

The plurality of the projections 162 may be projected from an upper surface of the light plate 161 to diffuse the light incident on the light plate 161, after fully reflected, in an upper direction with respect to the light plate 161.

The thickness (t) of the light plate 161 provided in the light guide unit 160 may be approximately 0.001 mm~1 mm.

If the light plate 161 is too thick, the image brightness of the display unit 110 could deteriorate. If it is too thin, the light is partially lost and the quantity of the light traveling upwardly is so small to deteriorate touch recognition.

The height (h) of the projection 162 provided in the light guide unit 160 may be approximately 1%~10% of the thickness (t) of the light plate 161.

The heights of the projections 162 may be different from each other or equal to each other.

The width (w) of the projection 162 provided in the light guide unit 160 may be approximately 0.1~5 um.

If the height and the width of the projection 162 are too large, the image brightness of the display unit 110 could deteriorate. If they are too small, the quantity of the light traveling upwardly could be so small to deteriorate the touch recognition.

The distance (d) between two neighboring ones of the projections 162 provided in the light guide unit 160 may be approximately 1 um~1000 um.

If the distance (d) of the two neighboring projections 162 is too narrow, Moire could occur and the reliability of the touch recognition could deteriorate. If the distance is too broad, the quantity of the light traveling upwardly could be so small to deteriorate the touch recognition.

As the case may be, the distance (d) between each two neighboring projections 162 may be irregular or uniform.

Figure 17A:
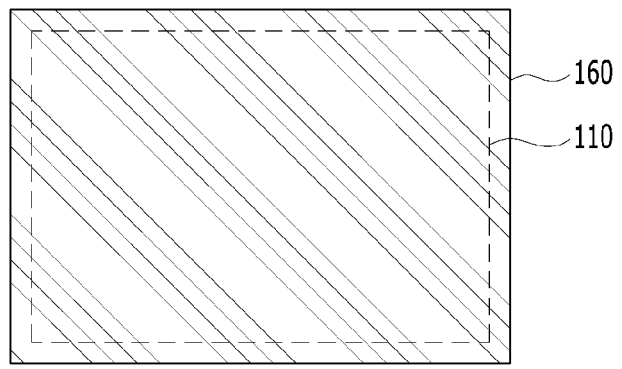
FIGS. 17A, 17B and 17C are plane views illustrating an area of the light guide unit.
Figure 17B:
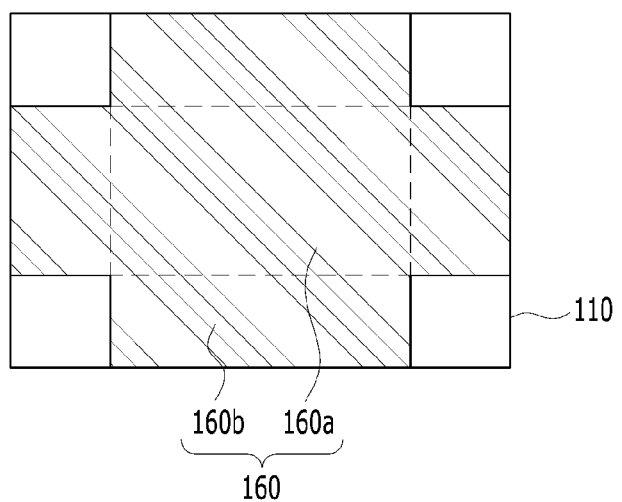
Figure 17C:
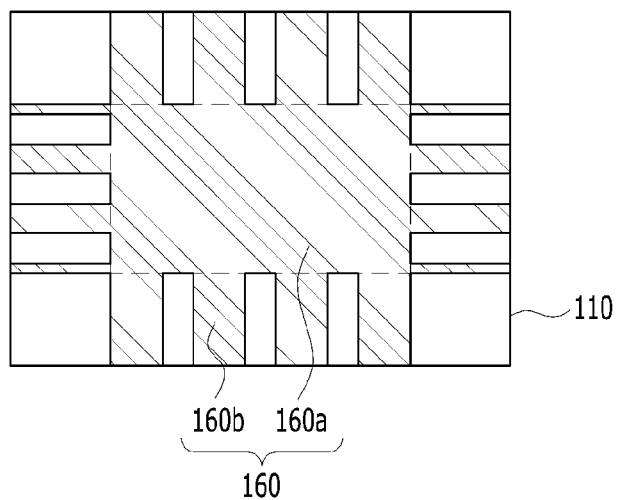

FIGS. 17A, 17B and 17C are plane views illustrating the area of the light guide unit.

As shown in FIGS. 17A, 17B and 17C, the light guide unit 160 may be arranged on the display unit 110 and it may guide the light incident thereon from the light emitting unit in an upper direction with respect to the display unit 110.

The area of the light guide unit 160 may be larger than the area of the display 110. As the case may be, the area of the light guide unit 160 may be smaller than the area of the display unit 110.

For example, as shown in FIG. 17A, the area of the light guide unit 160 may be larger than the area of the display unit 110 such that the light guide unit 160 can cover the front surface of the display 110.

In this instance, the light incident from the light emitting unit may be guided in an upper direction with respect to the display unit 110, without loss of the light. Accordingly, the quantity of the light traveling upwardly is much sufficiently and the touch recognition may be enhanced.

Alternatively, as shown in FIGS. 17B and 17C, the area of the light guide unit 160 may be smaller than the area of the display unit 110, with exposing a predetermined area of the display unit 110.

The light guide unit 160 may expose an edge area of the display 110.

In this instance, the light may be focused upwardly to a central area of the display unit 110 where a deadzone could occur easily and the display unit 110 may be partially exposed, such that the deterioration of the image brightness of the display unit 110 can be prevented which might be caused by the cover of the light guide unit 160.

The light guide unit 160 shown in FIGS. 17B and 17C may include a first light guide portion 160a arranged in a central area of the display unit 110 and a second light guide portion 160b arranged in an edge area of the display unit 110.

An area of the first light guide portion 160a is larger than an area of the second light guide portion 160b.

At this time, the plurality of the light emitting units may be arranged in a lateral surface of the second light guide portion 160b.

One second light guide portion 160b shown in FIG. 17B is arranged in each predetermined area of the display unit 110. A plurality of second light guide portions 160b shown in FIG. 17C may be arranged in a predetermined area of the display unit 110.

Figure 18:
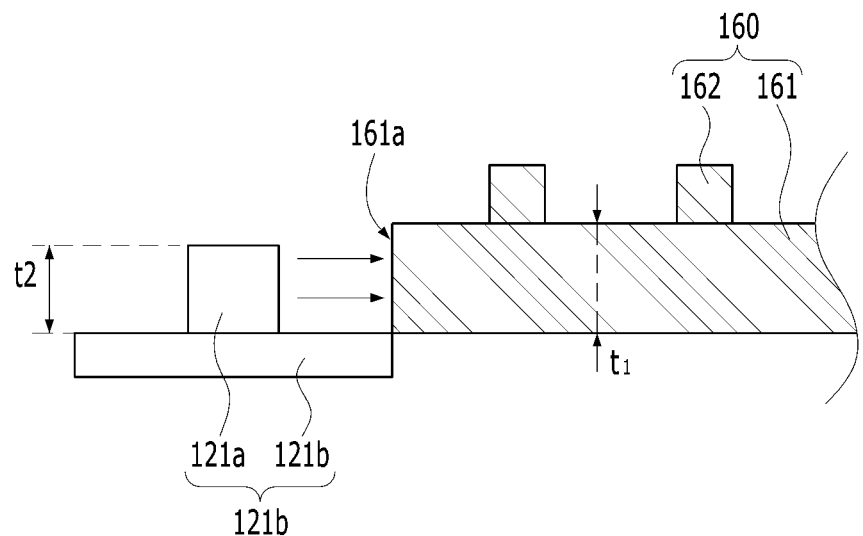
FIGS. 18, 19 and 20 are sectional diagrams illustrating a light emitting unit arranged in a lateral side of the light guide unit.
Figure 19:
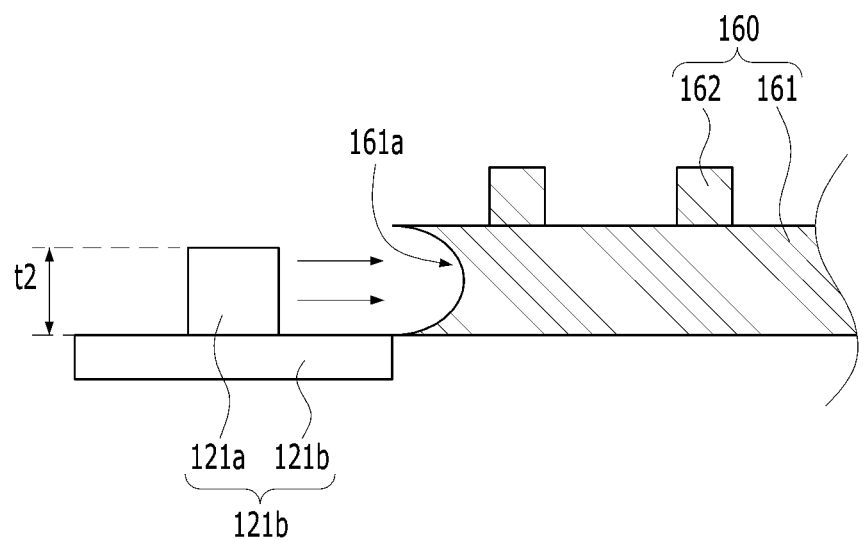
Figure 20:
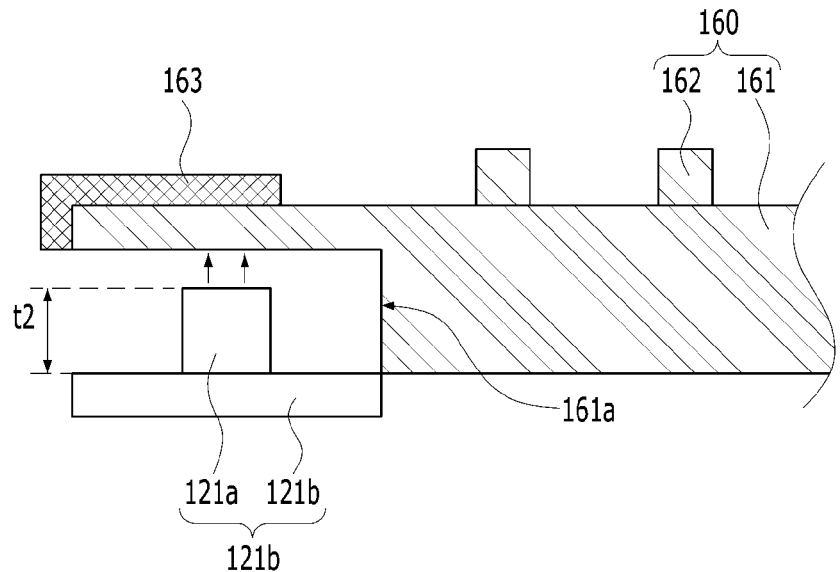

FIGS. 18 through 20 are sectional diagrams illustrating the light emitting unit arranged in the lateral surface of the light guide unit.

As shown in FIGS. 18 through 20, the light guide unit 160 may include the light plate 161 and the plurality of the projections 162.

The light plate 161 of the light guide unit 160 may fully reflect and guide the light incident thereon from the light emitting unit 121 toward a central area of the display unit 110.

The plurality of the projections 162 may be projected from an upper surface of the light plate 161 to diffuse the light incident on the light plate 161, after fully reflected, in an upper direction with respect to the light plate 161.

A lateral surface 161a of the light plate 161 provided in the light guide unit 160 may face a light emitting surface of the light emitting unit 121, spaced apart a preset distance from the light emitting surface of the light emitting unit 121, and spaced apart a preset distance from the light emitting surface of the light emitting element 121a provided in the light emitting unit 121.

A substrate 121b of the light emitting unit 121 may be provided under the light plate 161 of the light guide unit 160.

The thickness (t2) of the light emitting element 121a provided in the light emitting unit 121 may be equal to the thickness (t1) of the light plate 161 provided in the light guide unit 160.

The reason why the thickness (t2) is equal to the thickness (t1) is that the quantity of the light incident on the light plate 161 of the light guide unit 160 from the light emitting element 121a may be small.

However, the thickness (t2) of the light emitting element 121a of the light emitting unit 121 may be different from the thickness (t1) of the light plate 161 of the light guide unit 160 as the case may be.

The lateral surface 161a of the light plate 161 provided in the light guide unit 160 may be a plane surface shown in FIG. 18 or a concavely curved surface shown in FIG. 19.

In case the lateral surface 161a of the light plate 161 of the light guide unit 160 is concavely curved, the loss of the light incident on the light plate 161 of the light guide unit 160 from the light emitting element 121a may be reduced.

As the case may be, the lateral surface 161a of the light plate 161 provided in the light guide unit 160 may have a projected portion for covering a top of the light emitting unit 121 and a reflection plate 163 may be formed in an outer surface of the projected portion.

The reason why the reflection plate 163 is formed in the outer surface of the projected portion is to reduce the loss of the light incident on the light plate 161 of the light guide unit 160 from the light emitting element 121a.

At this time, the thickness (t2) of the light emitting element 121a of the light emitting unit 121 may be smaller than the thickness of the light plate 161 of the light guide unit 160.

Figure 21:
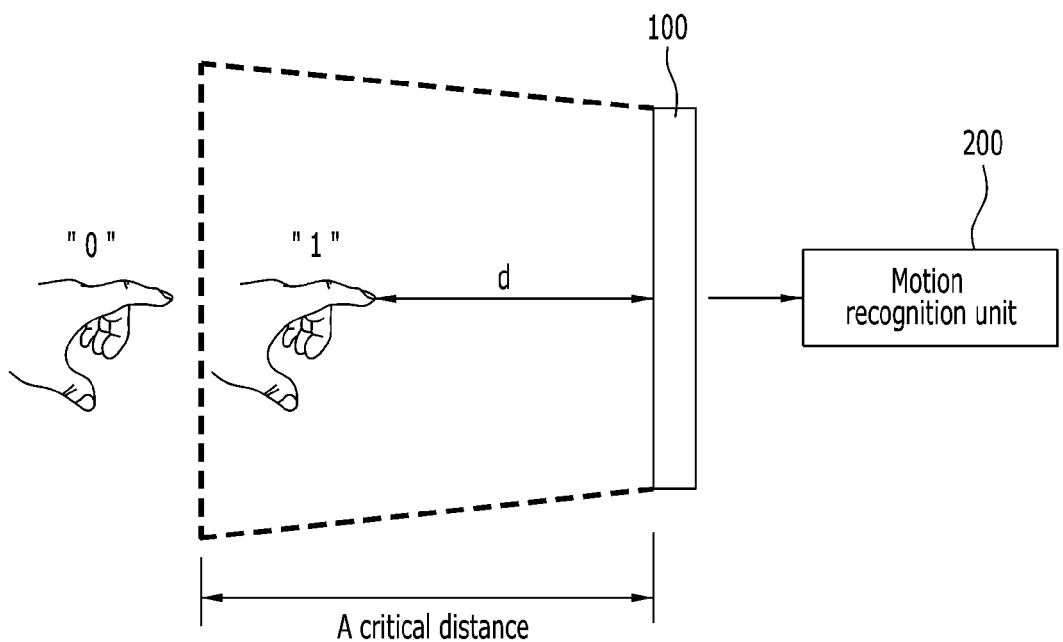
FIG. 21 is a diagram schematically illustrating a motion recognition unit for recognizing motion of a pointer.
Figure 22:
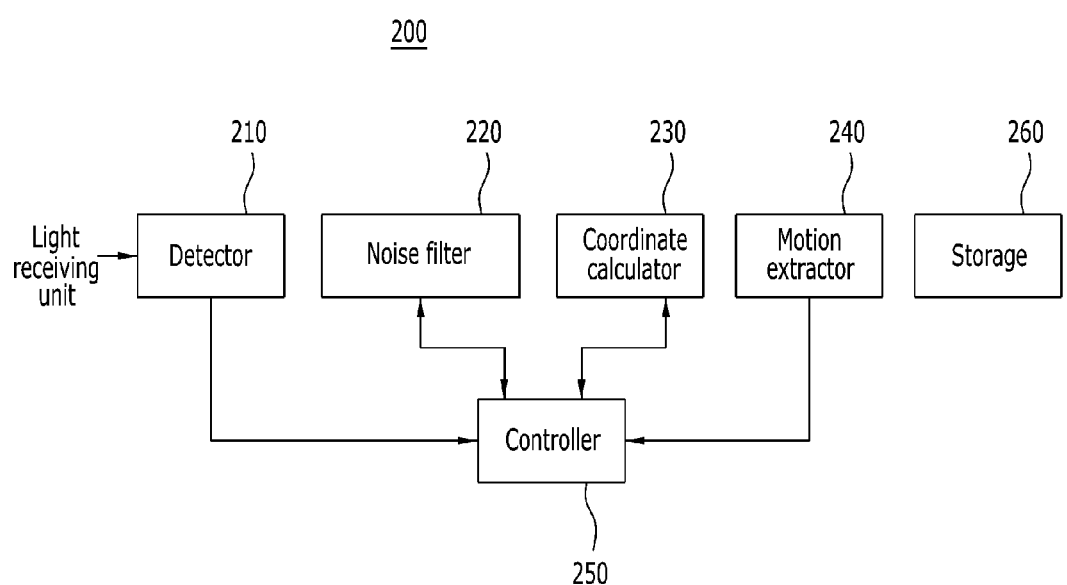
FIG. 22 is a block diagram illustrating the motion recognition unit.

FIG. 21 is a diagram schematically illustrating a motion recognition unit for recognizing motion of a pointer. FIG. 22 is a block diagram illustrating the motion recognition unit.

As shown in FIGS. 21 and 22, the motion recognition unit 200 may detect the quantity of the light reflected from the pointer spaced apart from the display unit of the electronic device 100 and extract a motion of the pointer based on the detected quantity of the light, to perform an operation corresponding to the extracted motion.

The motion recognition unit 200 may calculate the distance (d) between each photo sensor module and the pointer based on an electrical signal transmitted from the light receiving unit.

Typically, the distance between the photo sensor module and the pointer may be in inverse proportion to the quantity of the reflected light measured by the light receiving unit.

When calculating the distance between each photo sensor module and the pointer at a specific time point, the motion recognition unit 200 may use the distance between the light emitting unit irradiating the light at the specific time point and the light receiving unit.

At this time, the motion recognition unit 200 may acquire information on the distance between the pointer and each of the photo sensors including the light emitting unit and the light receiving unit in a preset cycle.

In other words, when the distance information between the photo sensor modules and the pointer is acquired once the plurality of the photo sensor modules provided in the bezel frame unit are put into operation, one cycle may be formed.

The motion recognition unit 200 may include a detector 210, a noise filter 220, a coordinate calculator 230, a motion extractor 240 and a controller 250.

The detector 210 may detect the quantity of the light reflected from the pointer through the light receiving unit. The noise filter 220 may filter the noise light which belongs to the other wavelength range except a preset wavelength range from the detected quantity of the light.

The coordinate calculator 230 may calculate an X-coordinate, a Y-coordinate and a Z-coordinate of the pointer based on the quantity of the light having the noise light eliminated there from. The motion extractor 240 may extract a preset motion of the pointer from the storage 260.

The controller 250 may control the detector 210, the noise filter 220, the coordinate calculator 230 and the motion extractor 240, and implement an operation corresponding to the extracted motion.

In the present disclosure, the light isolation unit or the light guide unit is arranged and 2D and 3D of the pointer may be sensed precisely and accurately, without the deadzone.

Furthermore, the present disclosure may diffuse the light of the light emitting unit and provide a broader touch area. The motion of the pointer located at a long distance may be extracted precisely and accurately to perform an operation corresponding to the extracted motion precisely.

Even a small pointer motion can be recognized easily and precisely, such that the reliability of the electronic device may be enhanced.

Figure 23:
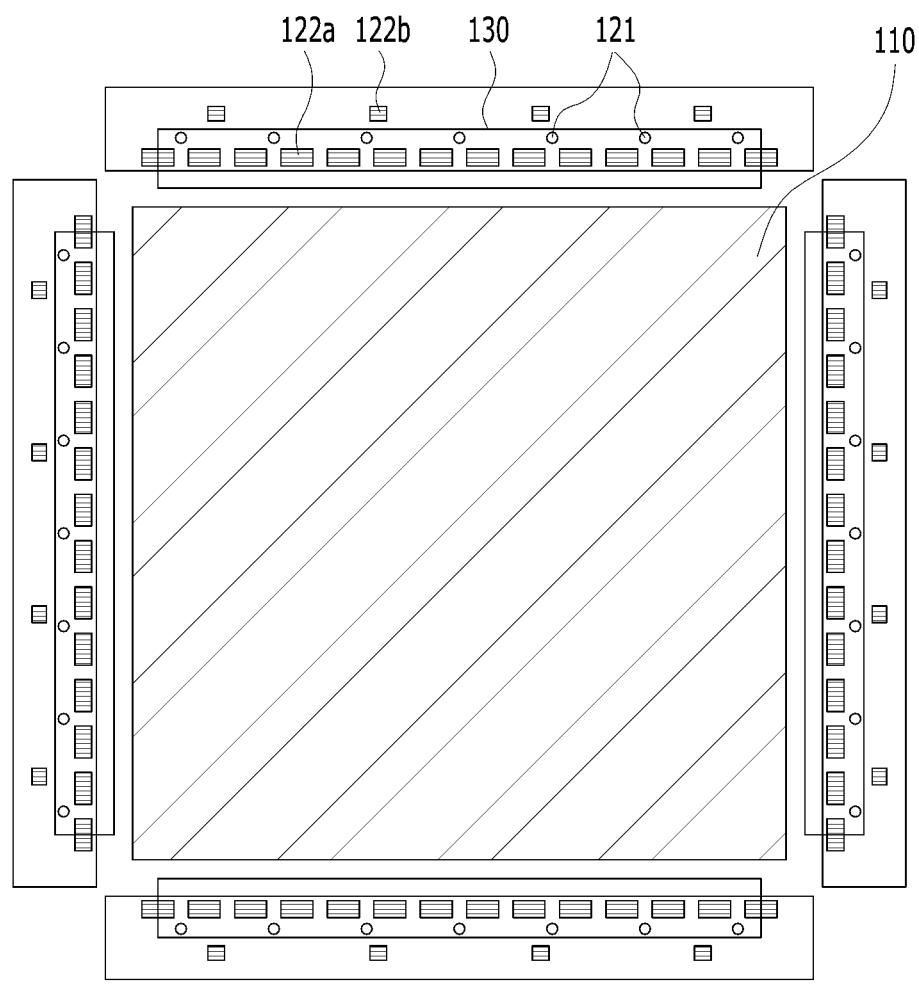
FIGS. 23, 24A and 24B are diagrams illustrating one embodiment of an electronic device to describe a method for controlling an electronic device in accordance with the present disclosure.
Figure 24A:
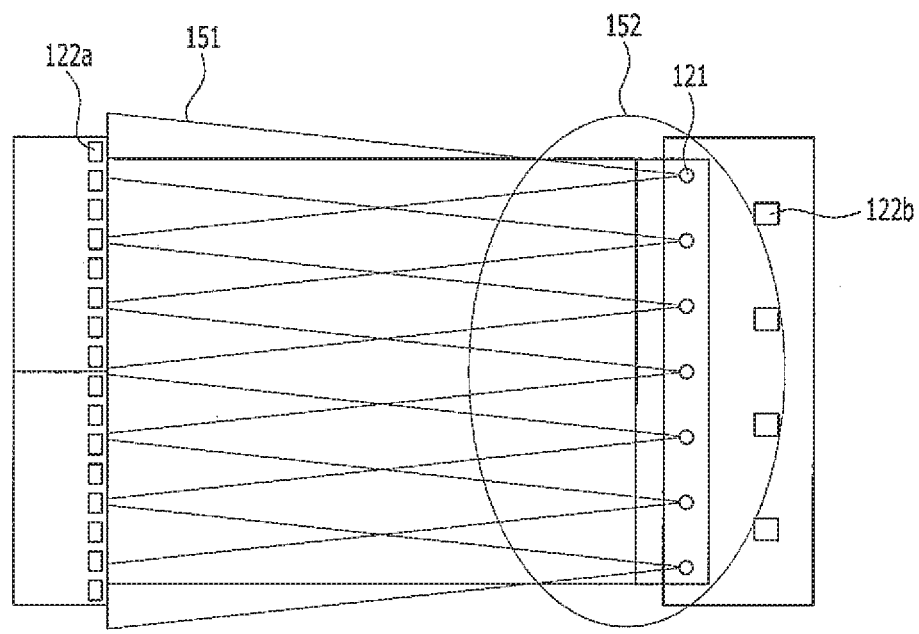
Figure 24B:
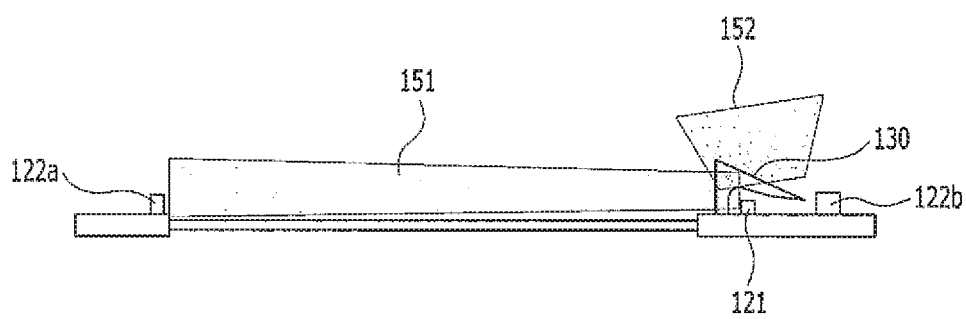

FIGS. 23, 24A and 24B are diagrams illustrating one embodiment of an electronic device to describe a method for controlling an electronic device in accordance with the present disclosure.

As shown in FIGS. 23, 24A and 24B, the electronic device in accordance with the embodiment of the present disclosure may include a display unit 110, a bezel frame unit 140, a plurality of light emitting units 121, a plurality of light receiving units 122, a light isolation unit 130, a driving control unit (not shown) and a motion control unit (not shown).

The bezel frame unit 140 may be arranged in an edge area of the display unit 110. The plurality of the light emitting units 121 may be arranged in the bezel frame unit 140, spaced apart a first distance from each other, and the plurality of the light receiving units 122 may be arranged in the bezel frame unit 140, spaced apart a second distance from each other.

The light isolation unit 130 may be located in a direction in which the light emitted from the light emitting units travels and it may isolate a first light 151 for sensing 2D touch and a second light 152 for sensing 3D touch from the light incident thereon from the light emitting units 121.

The driving control unit (not shown) may sequentially operate the plurality of the light emitting units 121 in accordance with a preset time period.

The driving control unit may sequentially operate the plurality of the light emitting units 121 in a clockwise or counter-clockwise direction based on the order of the arrangement.

At this time, the driving control unit may operate the plurality of the light emitting units 121 in a time period of approximately 10~99 microseconds (s).

If the time period is too long, the pointer coordinate calculation could be slow and the touch recognition could not be performed accurately. If the time period is too short, a circuit design has to be additionally provided to calculate coordinates of the pointer rapidly and manufacture cost could increase.

The motion recognition unit (not shown) may detect and interpolate the quantity of the first light 151 and calculate a horizontal coordinate. After that, it may detect the quality of the second light 152 reflected from a preset pointer and calculate a special coordinate, and extract a motion of the pointer based on the extracted quality of the light and perform an operation corresponding to the extracted motion.

The motion recognition unit may include a detector to detect the quantity of the light reflected from the pointer through the light receiving units 122; a noise eliminator to eliminate a noise light, which belongs to the other wavelength range except a preset wavelength range, based on the extracted quantity of the light; a coordinate calculator to calculate a X-coordinate, a Y-coordinate and a Z-coordinate based on the light quantity having the noise light eliminated there from; a motion extractor to extract a motion of the pointer; and a controller to control the detector, the noise eliminator, the coordinate calculator and the motion extractor and to implement an operation corresponding to the extracted motion.

At this time, the coordinate calculator may detect and interpolate the quantity of the first light 151 and calculate a horizontal coordinate. After that, the coordinate calculator may detect the quantity of the second light 152 reflected from a preset pointer and calculate a special coordinate.

As the case may be, the coordinate calculator may detect and interpolate the quantity of the first light 151 and calculate the horizontal coordinate after detecting the quantity of the second light 152 reflected from the preset pointer and calculating the special coordinate.

When compensating the quantity of the first light 151, the coordinate calculator may crossly interpolate the quantity of the first light 151 received from the light emitting units 121 facing each other.

The light receiving units 122 may include a plurality of first light receiving elements 122a arranged between a predetermined area adjacent to the light emitting unit 121 and the display unit 110 and a plurality of second light receiving elements 122 arranged in the other area adjacent to the light emitting unit 121 and the display unit 110.

A distance between two neighboring first light receiving elements 122a may be narrower than the first distance between the light emitting units 121.

The reason why the distance between the neighboring first light receiving elements 122a is narrower than the first distance is to receive first light 151 directly emitted from the light emitting units 121 facing each other, with no loss of the first light.

Alternatively, the distance between the neighboring second light receiving elements 122b may be broader than the first distance between the light emitting units 121.

The reason why the distance between the neighboring second light receiving elements 122b is broader than the first distance is to receive the second light 152 returning after reflected from the pointer, with no loss.

Accordingly, the number of the first light receiving elements 122a may be larger than the number of the second light receiving elements 122b and the present disclosure is not limited thereto.

The number of the first light receiving elements 122a may be larger than the number of the light emitting units 121.

As the case may be, some of the first light receiving elements 122a may be covered by the light isolation unit 130.

Alternatively, a light filter unit may be arranged on the light receiving unit 122 to transmit the light in a specific wavelength range there through.

The light isolation unit 130 may be arranged on the light emitting units 121 to cover the light emitting unit 121 and the present disclosure is not limited thereto.

The electronic device having the configuration mentioned above may sequentially operate the plurality of the light emitting units 121 based on a preset time period, using the driving control unit.

Hence, the light isolation unit 130 of the electronic device may isolate the first light 151 for sensing 2D touch and the second light 152 for sensing 3D touch from the light incident thereon from the light emitting units 121.

The first light receiving elements 122a may directly receive the first light 151 for sensing the 2D touch.

The motion recognition unit may detect and interpolate the quantity of the first light 151 and calculate the horizontal coordinate.

The second light receiving elements 122b may receive the second light 152 reflected from a preset pointer from the second light 152 for sensing 3D touch.

The motion recognition unit may detect the quantity of the received second light 152 and calculate the spatial coordinate based on the detected quantity of the second light. Then, the motion recognition unit may extract a motion of the pointer based on the detected quantity of the light and perform an operation corresponding to the extracted motion.

FIGS. 25A and 25B are diagrams illustrating the quantity data of the first light for sensing 2D which is received by the light receiving unit. FIG. 25A shows the light quantity data when no touch is recognized. FIG. 25B shows the light quantity data when touch is recognized.

As shown in FIG. 25A, the light receiving unit may receive the light directly emitted from the light emitting units facing each other and the motion recognition unit may calculate the quantity of the first light, when no touch is recognized.

As shown in FIG. 25B, the quantity of the first light received by the light receiving unit can change in A region, when touch is recognized.

At this time, the motion recognition unit may crossly interpolate the quantity of the first light emitted from the light emitting units facing each other and calculate the light quantity data based on the interpolated quantity, such that precise touch can be recognized.

For example, the light quantity data shown in FIG. 25B shows the light quantity data when touch of a pointer located at 50 meters is recognized.

FIGS. 26A, 26B and 26C are diagrams illustrating the light quantity data of the second light for sensing 3D touch which is sensed by the light receiving unit. FIG. 25A shows the light quantity data when no touch is recognized. FIG. 25B shows the light quantity data when touch is recognized.

As shown in FIG. 26A, the light receiving unit receives no light reflected from the pointer and the motion recognition unit has zero of the second light quantity data, when no touch is recognized.

As shown in FIGS. 26B and 26C, the light receiving unit may receive the reflected light in B region, when touch is recognized.

The motion recognition unit may calculate the quantity of the reflected light and recognize a spatial coordinate based on the calculated light quantity.

In other words, the motion recognition unit may recognize spatial touch by calculating the size, distance and location of the pointer based on the quantity data of the reflected light.

For example, the light quantity data shown in FIG. 26B shows the light quantity data when touch of a pointer located at approximately 7 cm is recognized. The light quantity data shown in FIG. 26C shows the light quantity data when touch of a pointer located apart approximately 10 cm is recognized.

FIG. 27 is a flow chart illustrating a method for controlling an electronic device in accordance with the present disclosure.

As shown in FIG. 27, the driving control unit of the electronic device may sequentially operate the plurality of the light emitting units based on a preset time period.

In other words, the electronic device may perform timesharing radiation of a single light from an outer area of the display unit. (S1)

The driving control unit may sequentially operate the plurality of the light emitting units in a clockwise or counter-clockwise direction based on an arrangement order of the light emitting units.

At this time, the driving control unit may operate the light emitting units in a time period of approximately 10~99 microseconds (μs).

If the time period is too long, the calculation of the pointer coordinate could be slow and touch recognition could fail to be precise. If time period is too short, a circuit design has to be additionally provided to calculate the coordinate of the pointer and the manufacture cost could increase.

The light isolation unit of the electronic device may isolate the first light for sensing 2D touch and the second light for sensing 3D touch from the light incident thereon from the light emitting units.

In other words, the electronic device may divide the single light emitted from the outer portion of the display unit into the plurality of the lights. (S2)

The light receiving unit of the electronic device may directly receive the first light for sensing 2D touch from the light emitting units facing each other.

In other words, the electronic device may directly receive the light incident in parallel to the display unit out of the divided lights. (S3)

After that, the motion recognition unit of the electronic device may detect and interpolate the quantity of the received first light and calculate a horizontal coordinate.

When the quantity of the first light is interpolated, the quantity of the first light received from the light emitting units facing each other may be crossly interpolated.

Specifically, the electronic device may crossly interpolate the quantity of the light directly incident in a horizontal direction and recognize the horizontal coordinate based on the interpolated quantity. (S4)

As the case may be, when the first light for sensing 2D is received, the noise light which belongs to the other wavelength range except a preset wavelength range may be eliminated.

The light receiving units of the electronic device may receive the second light reflected from a preset pointer out of the second lights for sensing 3D touch.

In other words, the electronic device may receive the reflected light of the light not incident in parallel to the display unit out of the divided lights. (S5)

When the reflected light of the second light for sensing 3D touch is received, the noise light which belongs to the other wavelength range except a preset wavelength range may be eliminated.

Hence, the motion recognition unit of the electronic device may detect the quantity of the received second light and calculate a spatial coordinate based on the detected quantity of the second light. After that, the motion recognition unit may extract a motion of the pointer based on the detected quantity of the light and operate an operation corresponding to the extracted motion.

In other words, the electronic device may recognize the spatial location of the pointer based on the quantity of the received reflected light. (S6)

After that, the electronic device identifies whether there is a request for ending the touch recognition operation and it ends the touch recognition operation when there is the request for ending the touch recognition operation. (S7)

If there is no request for ending the touch recognition operation, the electronic device may repeatedly and continuously implement the touch recognition operation.

The present disclosure has the advantage of sensing 2D and 3D touch of the pointer precisely and accurately, without the deadzone, which can be achieved by arranging the light guide unit or the light isolation unit for isolating the first light for sensing 2D touch and the second light for sensing 3D touch from the light incident from the light emitting unit.

Furthermore, the present disclosure may provide a broader touch area by diffusing the light emitted from the light emitting units and it has the advantage of implementing the operation corresponding to the motion of the pointer which is precisely and accurately extracted even when the pointer is located at a long distance.

Therefore, even a motion of a small pointer can be recognized easily and precisely and the reliability of the electronic device may be enhanced.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
    a display;
    a bezel frame unit configured to surround an edge area of the display;
    a plurality of light emitting units arranged in the bezel frame unit, spaced apart a first distance from each other;
    a plurality of light receiving units arranged in the bezel frame unit, spaced apart a second distance from each other;
    a light isolation unit located in a direction in which light emitted from the plurality of light emitting units travels, the light isolation unit configured to isolate a first light for sensing 2D touch and a second light for sensing 3D touch from lights incident thereon from the plurality of light emitting units;
    a detector configured to detect intensity of light reflected from a pointer via the plurality of light receiving units;
    a noise eliminator configured to eliminate a noise light belonging to a wavelength range other than a preset wavelength range from the detected intensity of light;
    a coordinate calculator configured to calculate an X-coordinate, a Y-coordinate, and a Z-coordinate of the pointer based on intensity of light having the noise light eliminated therefrom;
    a motion extractor configured to extract a motion of the pointer based on the calculated coordinates of the pointer; and
    a controller configured to:
        sequentially operate the plurality of the light emitting units based on a preset time period by controlling the plurality of the light emitting units; and
        implement an operation corresponding to the extracted motion by controlling the detector, the noise eliminator, the coordinate calculator, and the motion extractor.

2. The electronic device of claim 1, wherein the plurality of the light emitting units are sequentially operated in a clockwise or counter-clockwise direction based on an order of arrangement of the plurality of light emitting units.

3. The electronic device of claim 1, wherein the plurality of the light emitting units are operated in a time period of 10~99 microseconds (μs).

4. The electronic device of claim 1, wherein after calculating a horizontal coordinate by detecting and compensating intensity of the first light, the detector detects intensity of the second light reflected from the pointer and the coordinate calculator calculates a spatial coordinate based on the detected intensity of the second light.

5. The electronic device of claim 4, wherein the coordinate calculator crossly interpolates the intensity of the first light received from the plurality of light emitting units facing each other.

6. The electronic device of claim 1, wherein the plurality of light receiving units comprise:
    a plurality of first light receiving elements arranged between a first predetermined area adjacent to the plurality of light emitting units and the display; and
    a plurality of second light receiving elements arranged in a second predetermined area other than the first predetermined area, the second predetermined area adjacent to the plurality of light emitting units.

7. The electronic device of claim 6, wherein a distance between two neighboring first light receiving elements is less than the first distance between two light emitting units.

8. The electronic device of claim 6, wherein a distance between two neighboring second light receiving elements is greater than the first distance between two light emitting units.

9. The electronic device of claim 6, wherein a number of the plurality of first light receiving elements is greater than a number of the plurality of second light receiving elements.

10. The electronic device of claim 6, wherein a number of the plurality of first receiving elements is greater than a number of the plurality of light emitting units.

11. The electronic device of claim 6, wherein at least one of the plurality of first light receiving elements is covered by the light isolation unit.

12. The electronic device of claim 1, further comprising a light filter unit that is arranged on the plurality of light receiving units to transmit a light in a specific wavelength range there through.

13. The electronic device of claim 1, wherein the light isolation unit is arranged on the plurality of light emitting units to cover the plurality of light emitting units.

14. The electronic device of claim 1, wherein intensity of the first light for sensing 2D touch is different from intensity of the second light for sensing 3D.

15. The electronic device of claim 1, wherein the first light for sensing 2D touch travels in a direction parallel to a screen of the display.

16. The electronic device of claim 1, wherein the second light for sensing 3D touch travels in a direction inclined a preset angle with respect to a screen of the display.

17. A method for controlling an electronic device including a plurality of light emitting units, a plurality of light receiving units, a light isolation unit, a detector, a noise eliminator, a coordinate calculator, a motion extractor, and a controller, the method comprising:
    isolating, by the light isolation unit, a first light for sensing 2D touch and a second light for sensing 3D touch from light incident thereon from the plurality of light emitting units;
    detecting, by the detector, intensity of light reflected from a pointer via the plurality of light receiving units;
    eliminating, by the noise eliminator, a noise light belonging to a wavelength range other than a preset wavelength range from the detected intensity of light;
    calculating, by the coordinate calculator, an X-coordinate, a Y-coordinate, and a Z-coordinate of the pointer based on intensity of light having the noise light eliminated therefrom;

extracting, by the motion extractor, a motion of the pointer based on the calculated coordinates of the pointer;

sequentially operating the plurality of the light emitting units based on a preset time period according to controlling, by the controller, the plurality of the light emitting units; and implementing, by the controller, an operation corresponding to the extracted motion by controlling the detector, the noise eliminator, the coordinate calculator, and the motion extractor.

18. The method of claim 17, further comprising:

calculating, by the coordinate calculator, a horizontal coordinate by detecting and compensating intensity of the first light;

detecting, by the detector, intensity of the second light reflected from the pointer; and calculating, by the coordinate calculator, a spatial coordinate based on the detected intensity of the second light; and crossly interpolating, by the coordinate calculator, the intensity of the first light received from the plurality of light emitting units facing each other.

* * * * *